US007407434B2

(12) United States Patent
Thomas et al.

(10) Patent No.: US 7,407,434 B2
(45) Date of Patent: Aug. 5, 2008

(54) METHOD AND APPARATUS FOR A SECONDARY GAME PLAYED IN CONJUNCTION WITH A PRIMARY GAME

(75) Inventors: Alfred Thomas, Las Vegas, NV (US); Lawrence E. DeMar, Winnetka, IL (US); Scott D. Slomiany, Streamwood, IL (US); Duncan F. Brown, Grayslake, IL (US)

(73) Assignee: Case Venture Management, LLC, Wheeling, IL (US)

( * ) Notice: Subject to any disclaimer, the term of this patent is extended or adjusted under 35 U.S.C. 154(b) by 226 days.

(21) Appl. No.: 10/051,316

(22) Filed: Jan. 18, 2002

(65) Prior Publication Data

US 2003/0157977 A1 Aug. 21, 2003

(51) Int. Cl.
*A63F 13/00* (2006.01)

(52) U.S. Cl. .......................................................... 463/13

(58) Field of Classification Search .................. 463/42, 463/13

See application file for complete search history.

(56) References Cited

U.S. PATENT DOCUMENTS 5,135,224 A * 8/1992 Yamamoto et al. ...... 273/143 R
5,158,293 A * 10/1992 Mullins ...................... 273/139
5,332,219 A * 7/1994 Marnell, II et al. ............ 463/13
5,393,057 A * 2/1995 Marnell, II ............. 273/85 CP
5,397,125 A 3/1995 Adams .................... 273/138 A
5,505,449 A 4/1996 Eberhardt et al. ....... 273/138 A
5,569,082 A * 10/1996 Kaye .......................... 463/17
5,570,885 A 11/1996 Ornstein ...................... 463/27
5,722,891 A 3/1998 Inoue .......................... 463/20
5,775,692 A 7/1998 Watts et al. ................. 273/143
5,823,873 A 10/1998 Moody ........................ 463/13
5,823,874 A 10/1998 Adams ........................ 463/17
5,836,817 A * 11/1998 Acres et al. .................... 463/26
6,007,066 A * 12/1999 Moody ....................... 273/292

(Continued)

FOREIGN PATENT DOCUMENTS

EP 926 645 A2 6/1999

(Continued)

OTHER PUBLICATIONS

Multi-Play Poker by Bally Gaming, described in Strictly Slots, Dec. 2000, p. 62.

(Continued)

*Primary Examiner*—Ronald Laneau
*Assistant Examiner*—Emmanuel Omotosho
(74) *Attorney, Agent, or Firm*—McDonnell Boehnen Hulbert & Berghoff LLP

(57) ABSTRACT

The present invention is a method, device and system for playing a primary game played in conjunction with a secondary game in an attractive format. The primary game can be played with or without playing the secondary game in any of a multiple of embodiments. Various pre-determined step or steps may be specified that must be accomplished in order for play of the secondary game. Additionally, the games can be played wherein a player may wager on the outcome of either the primary game, the secondary game, or both Any winnings accomplished by a player may be paid in the form of an award, a prize, or other payout.

5 Claims, 14 Drawing Sheets

U.S. PATENT DOCUMENTS

| | | | | |
|---|---|---|---|---|
| 6,048,269 | A | 4/2000 | Burns et al. | 463/25 |
| 6,062,980 | A | 5/2000 | Luciano | 463/20 |
| 6,126,542 | A | 10/2000 | Fier | 463/16 |
| 6,174,234 | B1 | 1/2001 | Seibert, Jr. et al. | 463/20 |
| 6,311,976 | B1 * | 11/2001 | Yoseloff et al. | 273/138.2 |
| 6,336,860 | B1 * | 1/2002 | Webb | 463/22 |
| 6,468,156 | B1 * | 10/2002 | Hughs-Baird et al. | 463/25 |
| 6,569,013 | B1 * | 5/2003 | Taylor | 463/13 |
| 6,609,978 | B1 * | 8/2003 | Paulsen | 463/42 |
| 6,685,563 | B1 * | 2/2004 | Meekins et al. | 463/25 |
| 6,749,500 | B1 * | 6/2004 | Nelson et al. | 463/13 |
| 6,857,959 | B1 * | 2/2005 | Nguyen | 463/25 |
| 2005/0014553 | A1 * | 1/2005 | Byrne | 463/18 |

FOREIGN PATENT DOCUMENTS

| | | | |
|---|---|---|---|
| EP | 944 030 | A2 | 9/1999 |
| EP | 984 407 | A2 | 3/2000 |
| EP | 984 408 | A2 | 3/2000 |

OTHER PUBLICATIONS

Description of Twin Lightning by Bally, 1972.
Royal Comet by Pace, 1937.
Double by Mills, 1968.

* cited by examiner

PLAYER TRACKING SYSTEM

METHOD AND APPARATUS FOR A SECONDARY GAME PLAYED IN CONJUNCTION WITH A PRIMARY GAME

FIELD OF THE INVENTION

This invention relates generally to an apparatus and method for playing a primary game in conjunction with a secondary game, and more particularly to a gaming machine method and apparatus having a primary game upon which a player wagers on the results of the primary game with the possibility of also winning an award or prize based on the results of a secondary game which is being played out with the primary game.

BACKROUND OF THE INVENTION

Gaming machines traditionally charge a fee in the form of a coin or a credit to play a game of chance. When the player wins, coins are often dispensed from the machine. More recently, the machines accumulate and reward credits, which may be dispensed as coins or cash on request. Other recent implementations dispense tickets, which may be redeemed for cash or in some cases be inserted into a gaming machine to be converted back into credits.

There have also been gaming machines that dispense other coinage of value, such as silver and gold souvenir coins (in addition to ordinary coins or gaming tokens). Reference can be made to U.S. Pat. No. 5,397,125 to Adams, for one such instance.

Some gaming machines have also offered valuable items such as cars, boats, motorcycles and diamonds, but only for hitting very high-odds awards. This type of award is calculated to occur very infrequently. Gaming machines are typically mathematically designed such that in the long run each returns less than 100% of the amount that is wagered. Taking one example, Table 1 shows one paytable (payout table) typical for a "Jacks or Better" draw poker game.

TABLE 1

| | |
|---|---|
| Royal Flush | 800 |
| Straight Flush | 50 |
| 4 of a Kind | 25 |
| Full House | 7 |
| Flush | 5 |
| Straight | 4 |
| 3 of a Kind | 3 |
| 2 Pair | 2 |
| Pair of Jacks or Better | 1 |

This paytable is often referred to as a "Seven-Five Jacks or Better" paytable. The name comes from the pays for Full House and Flush which are seven and five credits, respectively. Many of the "Jacks or Better" draw poker games use this same paytable with the Full House and Flush values modified to adjust the payout percentage. It is well known that this Seven-Five paytable will provide a return of 96.1472% to the player with optimal play. It is also known that adjusting this game to the popular Nine-Six paytable (changing Full House to award nine credits and Flush to award six credits) will result in a game with a payout percentage of 99.5439.

The point of the foregoing exemplary analysis is this: the actual return on a wagering game, whether precisely known by a player or merely intuitively perceived, can have an impact on whether that game is played, or not. It is a constant effort in the gaming industry to come up with games that players want to play. One such element in that effort is to provide odds that appeal to the player relative to the size of the wager and return. Others include an interesting or entertaining game play or format, as well as an attractive game presentation, just to name a few of the elements that can drive a successful game from the standpoint of the manufacturer, operator, as well as the player.

SUMMARY OF THE INVENTION

Broadly speaking, this invention allows for additional awards in a game of chance. It is accordingly one objective of the present invention to provide a primary (main, base, or underlying) game of chance, which includes a secondary (bonus) game that is played in conjunction with the primary game, where the secondary game allows for additional award(s). The combined games can then be set to yield a higher payment percentage, yet still provide the operator (e.g., the house) with a satisfactory overall account being retained. This payment percentage can be based, in one form of the invention, on the knowledge that there will be a significant factor of non-optimal play where a player has the ability to choose between proceeding to attempt to succeed on the primary or the secondary game. For instance, the player may have a winning game in hand, or good odds for a winning game, in the primary game, yet choose to forego that for a potential reward in the secondary game, which may be at less favorable odds.

In one embodiment of the invention, the chance to win additional awards is combined with traditional five card draw video poker. Applicants generally refer to the game in this combination as "Deal and Win", because the secondary game gives the player the ability to "win" an extra award on the five card "deal" part of the draw poker game, whether or not the player gets a good poker hand.

It will also be borne in mind that, while the invention is generally described herein as it relates to a gaming machine, its application has much greater range. The invention is a game and method for playing the game in a broad sense. It can accordingly be adapted to many environments and embodiments besides a casino video gaming machine, such as an Internet-based game, a table game, a home video game, hand-held game, and so on.

This invention allows various awards to be offered in addition to the typical coin and credit awards available in a standard gaming machine. In one form of the invention, awards are dispensed using a ticket or voucher printer for redeeming the ticket or voucher at a different location for the award. In another form, these awards are in the form of tangible merchandise. In another form, these tickets are gift points that may be used to buy or trade for merchandise.

In yet another form, these awards are "slot club" points credited directly through a player tracking system. In still yet another form, these awards are other things of value (cash, gift points, merchandise, etc.) that are awarded to the player through the player tracking system. Moreover, it is contemplated that gift points can be awarded or dispensed from one or many similar machines that can then be added up and redeemed for gifts at a redemption center.

As discussed above, overall gaming machines are designed to return less than 100% of the amount that is wagered. Because the awards given through the invention are of value, the value of the award(s) is now factored into the return calculation.

It is well known that the 7-5 paytable for "Jacks or Better" draw poker shown in Table 1 has a return of 96.1472% when played optimally. Additionally, machines typically return 2-4% less as a result of non-optimal play by many players, resulting in a return of about 92-94%.

An implementation of the "Deal and Win" awards herein has awards worth about 3.3% of all money wagered on a five-coin quarter game. This results in a possible 99.4472% long-term return with optimal play and an expected return of about 95.5% to 97.5% as a result of non-optimal play. Of the money wagered, 2.5% to 4.5% is thus retained by the gaming machine operator (e.g. the casino).

One way to implement the assignment of award values to the playing cards is to make an independent random number draw to assign the award value before making a random number draw for the card face. While the card face random number would be zero to fifty-one to select one of fifty-two possible card faces, the award selection could independently choose from any size list of awards, such as 100 or 200 possible award items just to take two instances. One embodiment uses the foregoing sufficient flexibility to fine tune the probabilities and expected value contributions of the awards. Instead of using separate random numbers for each card selection out of fifty-two cards and separate random numbers for each award selection out of a different selection range each award selection could be associated with a particular card face as if it were printed on a physical card.

The assignment of awards to cards can be done in any manner without departing from the invention, but one possible assignment is done such that the larger "Deal and Win" awards do not coincide with particularly good poker hands. Another way to assign the winning awards is completed by assigning the winning awards to coincide with particularly bad poker hands. There are many other rules that could be applied to the "Deal and Win" awards for winning without departing from the invention.

One embodiment of the present invention is a method of operating a gaming machine, comprising the steps of providing a first game of chance and providing a second game of chance that has the potential for achieving a prize award. This method also includes a step of operating the first game of chance and the second game of chance in conjunction with the first game of chance. The method awards any prize achieved in the second game of chance. The prizes that can be won include monetary, non-monetary prizes, tangible goods, goods or services, a point value (such as gift points, slot club points, and the like), or a combination thereof.

Another embodiment of the invention is the above method of operation wherein the second game of chance is operated only once and at the beginning of the first game of chance.

Still another embodiment of the invention is the method of operation wherein the second game of chance is a game including a plurality of differing prize indicia and a preset number of the prize indicia displayed in the course of the second game through a random selection. Any prize won is achieved through a predetermined association of the prize indicia. It is envisioned that any prize won may be of a single type of prize or may be one of a plurality of different prize awards.

Yet another embodiment of the present invention is a method of operation wherein the association of the prize indicia is a match between or among a predetermined number of prize indicia.

In a contemplated embodiment of the invention, the method of operation has the first game of chance as a card game, and the step of providing the first game of chance includes dealing a hand of cards to a player. In this aspect, the step of providing a second game of chance includes displaying the randomly selected prize indicia in a like number to the cards in the hand. In yet another form of the invention, the card game is a five card poker game, and five randomly selected prize indicia are displayed.

This embodiment may also include a method of operation wherein the card game further comprises a step of dealing an opening hand of cards from which a player can choose to select cards to hold as well as select cards to discard. In this form of the invention, the second game of chance is operated only in conjunction with the opening hand.

In another embodiment of the invention, the method of operation includes the card game further comprising a step of dealing an opening hand of cards from which a player can choose to select cards to hold as well as select cards to discard. The cards also display an opening display of prize indicia associated in a one to one correspondence with each card in the hand. Each opening prize indicia is selected as well as discarded in accordance with its associated card. The card game includes a further step of replacing any discarded card with another randomly selected card and the second game of chance including the step of replacing any discarded prize indicia with another randomly selected prize indicia.

The invention also includes a method of operation wherein the first game of chance is a slot game having a reel display with a plurality of reels having first game indicia thereon. The step of providing the first game of chance includes displaying randomly selected first game indicia for each reel, and the step of providing a second game of chance includes displaying the randomly selected prize indicia in a like number to the reels.

As noted, embodiments may variably have monetary prizes, non-monetary prizes, tangible goods, goods or services, a point value (such as gift points, slot club points, and the like), or a combination thereof. A predetermined schedule of different prizes may be provided with a prize being earned through the player achieving a preset point value for each prize.

In another embodiment, the method includes a further step of providing a third game that is a bonus game. Here, one or all of the prize awards in the second game is the ability to operate the bonus game.

The invention also includes method of operation including a further step of providing a player tracking system in which players are selectively enrolled, and where the second game of chance is only operated if a player is enrolled in the player tracking system.

The invention also advantageously has a further step of providing a mechanism for registering a wager input for a player, and requiring that a wager input be placed by a player before operating the first game of chance.

In an embodiment of the invention, having the first game of chance as a card game employing a deck of cards, the second game of chance is a game having a plurality of differing prize indicia. Play of the second game of chance includes assigning a prize indicia to each card of the deck of cards and providing the first game of chance by dealing a hand of cards to a player from the deck of cards. The step of providing the second game of chance includes displaying the prize indicia with the hand of cards, and the prize award is achieved through a predetermined association of the prize indicia. It is envisioned that the deck of cards can be physical (actual cards) or merely visual (e.g., video).

In embodiments of the invention, the card game further includes a step of dealing an opening hand of cards from which a player can choose to select cards to hold as well as select cards to discard, and wherein the second game of chance is operated only in conjunction with the opening hand of the first game.

In still other embodiments of the invention, the card game further comprises a step of dealing an opening hand of cards from which a player can choose to select cards to hold as well as select cards to discard, and displaying an opening display of prize indicia associated in a one to one correspondence with each card in the hand. Each opening prize indicia is selected as well as discarded in accordance with its associated card. The card game including a further step of replacing any discarded card with another randomly selected card and the second game of chance including a step of replacing any discarded prize indicia with another randomly selected prize indicia.

It is also envisioned that in other embodiments of the invention, the first game of chance is a slot game having a reel display with a plurality of reels having first game indicia thereon. The step of providing the first game of chance includes a display of randomly selected first game indicia for each reel, and the step of providing a second game of chance includes displaying the randomly selected prize indicia in a like number to the reels. Another aspect of the invention can include a further step of providing a third game that is a bonus game wherein the prize award in the second game is the ability to operate the bonus game.

It is envisioned that the slot game can include prize awards that are tangible goods, goods, services, or registered as a point value (such as gift points, slot club points, and the like), a combination thereof, or wherein a predetermined schedule of different prizes are provided with each prize being earned through achievement of a preset point value for that prize.

In an embodiment where the first game of chance is a slot game having a reel display with a plurality of reels having first game indicia thereon, the second game of chance is a game having a plurality of differing prize indicia. The method includes the steps of operating the first game of chance by displaying randomly selected first game indicia for each reel of the plurality of reels in the reel display, and operating the second game of chance in conjunction with the first game of chance by displaying a respective randomly determined prize indicia for each reel in the reel display. The method also includes a step of awarding any prize award achieved in the second game of chance. The prize award is one of a plurality of different prize awards, and is achieved through a predetermined association of the prize indicia. The method of operating the gaming machine can award prizes that are tangible goods, goods or services, or point values (such as gift points, slot club points, and the like), or a combination thereof. It is further envisioned that the invention according to the foregoing method of operating a gaming machine may advantageously include the step of placing a wager. This may, but need not necessarily require that the wager is a threshold monetary amount.

Another embodiment of the method of operating a gaming machine includes a step of providing a card reader for reading cards provided to players belonging to a gaming consortium, and wherein the step of placing a wager includes reading a card, if a card is used while placing the wager, and wherein the preset type of wager requires use of a card while placing the wager.

Another embodiment of the method of operating a gaming machine further includes a step of providing an apparatus for printing a slip, and the step of awarding any prize includes printing a slip with the prize achieved indicated thereon. The gaming machine has a printer as a part of the machine and the printer comprising the apparatus for printing a slip, for instance. Alternatively, a printer is located remotely from the gaming machine.

As noted, in certain embodiments of the game playing method, the second game of chance is operated only once and at the beginning of the first game of chance. For instance, the first game of chance is a card game and the step of providing the first game of chance includes dealing a hand of cards to a player. Here, the step of providing a second game of chance includes displaying the randomly selected prize indicia in a like number to the cards in the hand. The second game of chance is then operated only in conjunction with the opening hand, and the card game continues after the display of prize indicia.

In some embodiments of the game playing method, the card game further includes a step of dealing an opening hand of cards from which a player can choose to select cards to hold, as well as select cards to discard, and displaying an opening display of prize indicia associated with a respective card in the hand. Opening prize indicia are selected as well as discarded in accordance with its associated card. The card game includes the further step of replacing any discarded card with another randomly selected card and the second game of chance includes the step of replacing any associated discarded prize indicia with another randomly selected prize indicia.

Still other embodiments of the invention include a further step of providing a third game which is a bonus game, and the prize award in the second game is the ability to operate the bonus game.

Other embodiments of the game playing method include a further step of providing a player tracking system in which players are selectively enrolled, and the second game of chance is only operated if a player is enrolled in the player tracking system.

Of course, the invention is not only embodied as a game and method, but also a game playing apparatus. The game playing apparatus comprises a game display, a first methodology operating a first game of chance and displaying the first game on the display, and a second methodology operating a second game of chance and displaying the second game on the display. The second game has the potential for achieving a prize award, wherein the second methodology operates the second game in conjunction with the first game, with a determination of any prize award that may be achieved in the second game.

In one embodiment of the game playing apparatus, the game display is a video monitor, and further includes a CPU operating the apparatus including the video monitor according to a computer program. The computer program can execute the first and second methodologies.

In another embodiment of the game playing apparatus, the apparatus further includes a wager input mechanism communicating with the CPU. The wager input mechanism registers a wager placed by a player. The program includes a random number generating subroutine and an imbedded paytable. The imbedded paytable yields payouts in accordance with the first methodology.

The game playing apparatus can further include a player command input mechanism. For instance, a card game embodiment can further comprise dealing an opening hand of cards from which a player can choose to select cards to hold, as well as select cards to discard using the command input mechanism. The second game of chance can be set up such that it is operated only in conjunction with the opening hand. The card game continues after the display of prize indicia. In one version, the card game comprises the step of dealing an opening hand of cards from which a player can choose to select cards to hold, as well as select cards to discard using the command input mechanism. The apparatus displays an opening display of prize indicia associated in a one to one correspondence with each card in the hand. Each of the opening prize indicia are selected as well as discarded in accordance with its associated card. The card game includes replacement of any discarded card with another randomly selected card and the second game of chance includes replacement of any discarded prize indicia with another randomly selected prize indicia.

As a gaming machine, an embodiment comprises an operating system and a display for displaying a first game of chance and a second game of chance. The first game of chance is played with a plurality of game elements and the second game of chance is played with a plurality of prize elements. The gaming machine also comprises a wager input mechanism that registers a wager input by a player upon an outcome of the first game of chance. The wager includes registration of an amount bet. The operating system includes a methodology for play of the first game of chance wherein each of the game elements has a game indicia thereon. A random selection mechanism randomly selects a subset of the plurality of game elements in play of the first game of chance.

The operating system also includes a methodology for play of the second game of chance wherein each of the prize elements has a prize indicia thereon. The random selection mechanism randomly selects a subset of the plurality of prize elements in play of the second game of chance and each correlates to each of the subset of the plurality of game elements. The methodology will determine an outcome of the first game of chance based upon combinations of the game indicia of the subset of the plurality of game elements and award winnings, if any, per a paytable and the wager. The methodology will also determine an outcome of the second game of chance based upon combinations of the prize indicia of the subset of the plurality of prize elements and award a prize, if any, per a paytable of winning combinations.

The gaming machine is in certain forms a video gaming machine, the display is a video monitor, and the operating system includes a CPU with a program having the methodology as part of the program. The program further drives the display according to the program. The random selection mechanism comprises a random number generating routine.

Variations of these embodiments could be made that include, but not limited to, specifying wild cards, adding jokers, or creating bonus paytables, all of which can be done without departing from the invention. Still other variations of the invention include a first game of chance that is a hearts game, a crazy eights game, or any other game adapted for play in a wagering environment, that are played in "live" games, gaming machines, or any other type of play.

These and other objectives and advantages achieved by the invention will be further understood upon consideration of the following detailed description of embodiments of the invention taken in conjunction with the drawings, in which:

DETAILED DESCRIPTION OF EMBODIMENTS OF THE INVENTION

The embodiments of the invention described hereinafter have been particularly adapted for play on a video display, and even more particularly for play upon a video gaming machine. As noted earlier, the game could easily be adapted for play on a mechanical gaming machine, a table game, or for any other conceivable environment where games are played, without departing from the invention.

Figure 1:
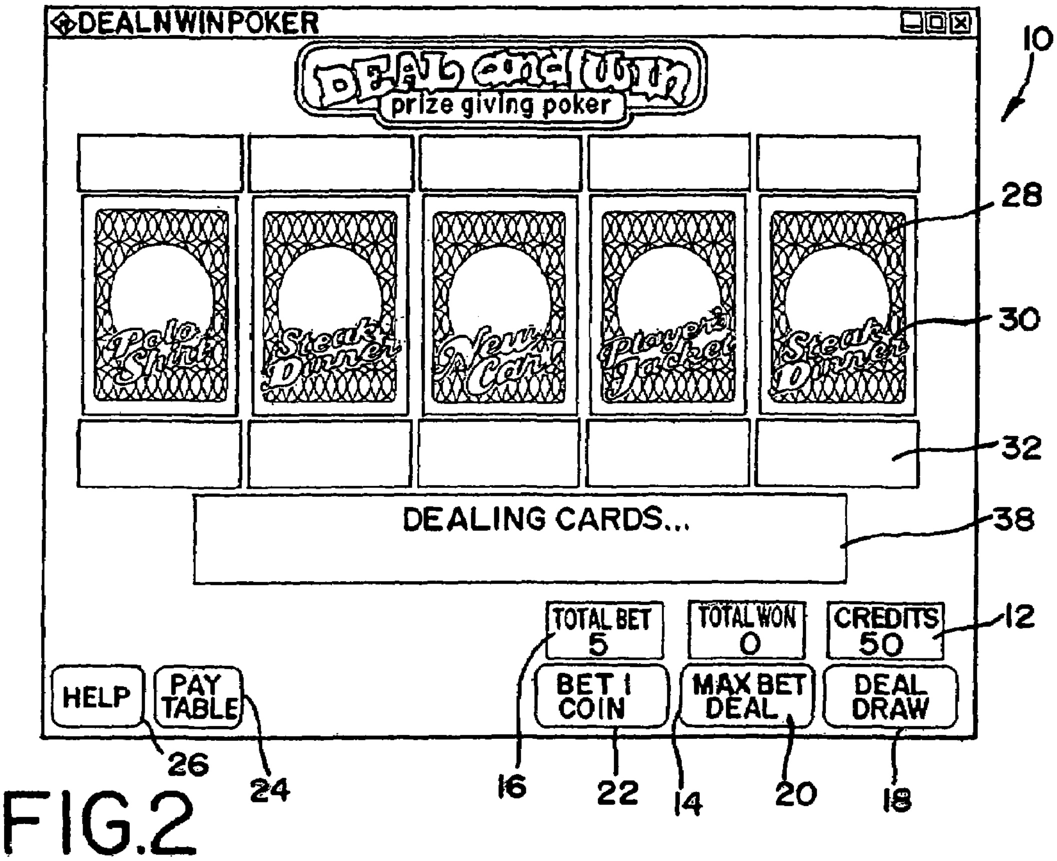
FIGS. 1 through 8 are screens from a video display showing a first embodiment of the invention in a gaming machine.

What is shown in FIG. 1 through FIG. 8 of this disclosure is a representation of a video display (a monitor or a screen) of a game at moments in time. FIG. 1 depicts a typical display at the start of a "Deal and Win" poker game 10. The poker game in this embodiment is a "Jacks or Better" five card draw poker game as is well known in the art. The game uses a standard fifty-two card deck of playing cards. Additionally, each of the fifty-two cards has a bonus award value associated with it.

FIG. 1 shows various meters and buttons including a "Credit" meter 12, a "Total Won" meter 14, a "Total Bet" meter 16, a "Deal/Draw" button 18, a "Max Bet Deal" button 20, a "Bet 1 Coin" button 22, a "Pay Table" button 24, and a "Help" button 26. This form of the preferred embodiment utilizes a touch screen, that is well known in the art, for displays and inputs. The functions of these meters and buttons may also be accomplished through mechanical means, as well as a pointing device or the like, in addition to, or instead of the video buttons.

A player may actuate the "Bet 1 Coin" button 22 to indicate a bet ranging from one to five coins. The player then actuates the "Deal/Draw" button 18 to start the hand and deal the cards. The player may instead actuate the "Max Bet Deal" button 20 to establish a bet of five coins and initiate the deal of the cards. The maximum coin bet on the hand of five coins is arbitrarily chosen, and may be made smaller or larger without departing from the invention.

Once the player actuates either the "Deal/Draw" button 18 or the "Max Bet Deal" button 20, a Random Number Generator (RNG) (not shown), as is well known by those skilled in the art, is used to "deal" five cards randomly from the standard fifty-two card deck.

One method of presentation of the card faces and bonus awards is shown in FIG. 1. Here, the game deals the cards face down showing the card backs 28 with the bonus award values 30 printed on the back of each card. The bonus award values 30 from left to right are "Polo Shirt", "Steak Dinner", "New Car", "Player's Jacket", and "Steak Dinner". Thus in this embodiment, as the cards are dealt to the player, the bonus awards values 30 are shown as well as the card backs 28.

Figure 2:
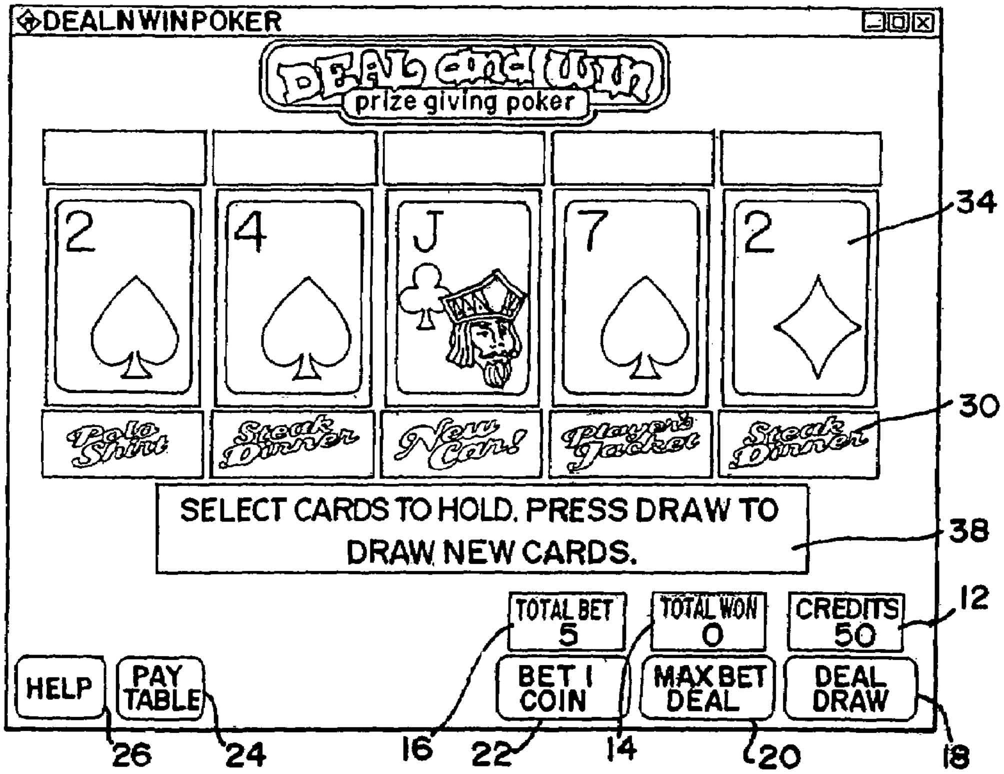

After the card backs 28 and award values 30 have been displayed, the award values are caused to visually "slide down" off of the cards into spaces indicated by rectangles 32 located below each card. The cards are then visually "turned over" showing their standard card faces 34, as shown in FIG. 2.

It should be noted that the particular presentation of showing the awards on the card backs then "sliding" the awards off and turning over the cards is not required, but merely an interesting presentation of the information to the player. Any manner of presentation may be used without departing from the invention, such as: dealing the cards directly to a display as shown in FIG. 2, dealing the cards, then dealing the award values or printing the award values on the card faces, and so forth.

In this embodiment, if the player receives five matching award values, the player wins the stated award. Of course, any other set of winning combinations could be defined without departing from the invention, such as requiring four or more of an award symbol, allowing "Wild" symbols, an "Instant Winner" symbol or other defined successful combinations. In this illustrative embodiment, it is required that the maximum five coin bet be placed to be eligible for the "Deal and Win" awards. It will be seen later that the percentage calculation is based on this five coin bet. The award could be given without requiring a maximum bet, or requiring a specific bet, just to name two other variations.

Figure 3:
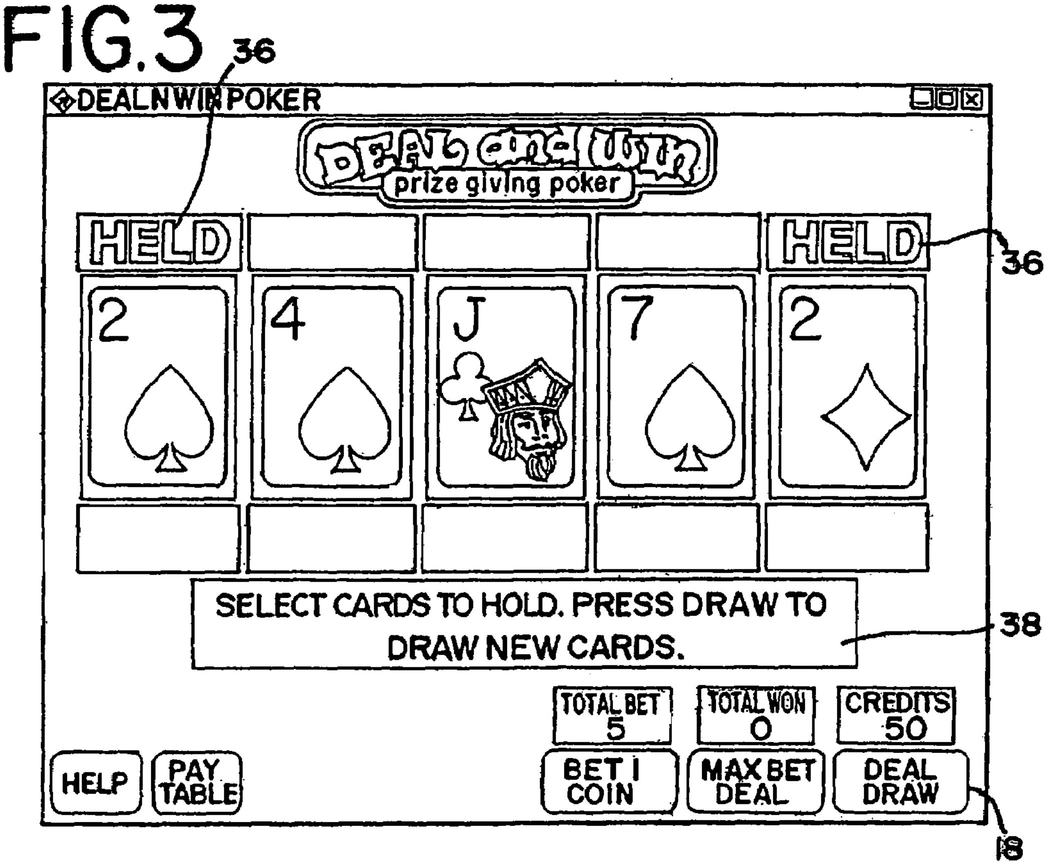

If the player does not receive five matching award values 30 (as in FIG. 2), then the award values 30 disappear at the player's next activation of any button or the touch screen and the "Deal and Win" game is over. The player then continues to play out the "Jacks or Better" five-card draw poker game. FIG. 3 shows that the player has chosen to "hold" the pair of twos (as indicated by "Held" 36 being shown over these cards). The player indicates whether to hold the cards by use of the touch screen or alternatively by actuating "Hold" buttons (not shown) or some pointing device. The player then actuates the "Deal/Draw" button 18 to discard the cards that are not held or kept, and to receive replacement cards, as directed by the information box 38.

Figure 4:
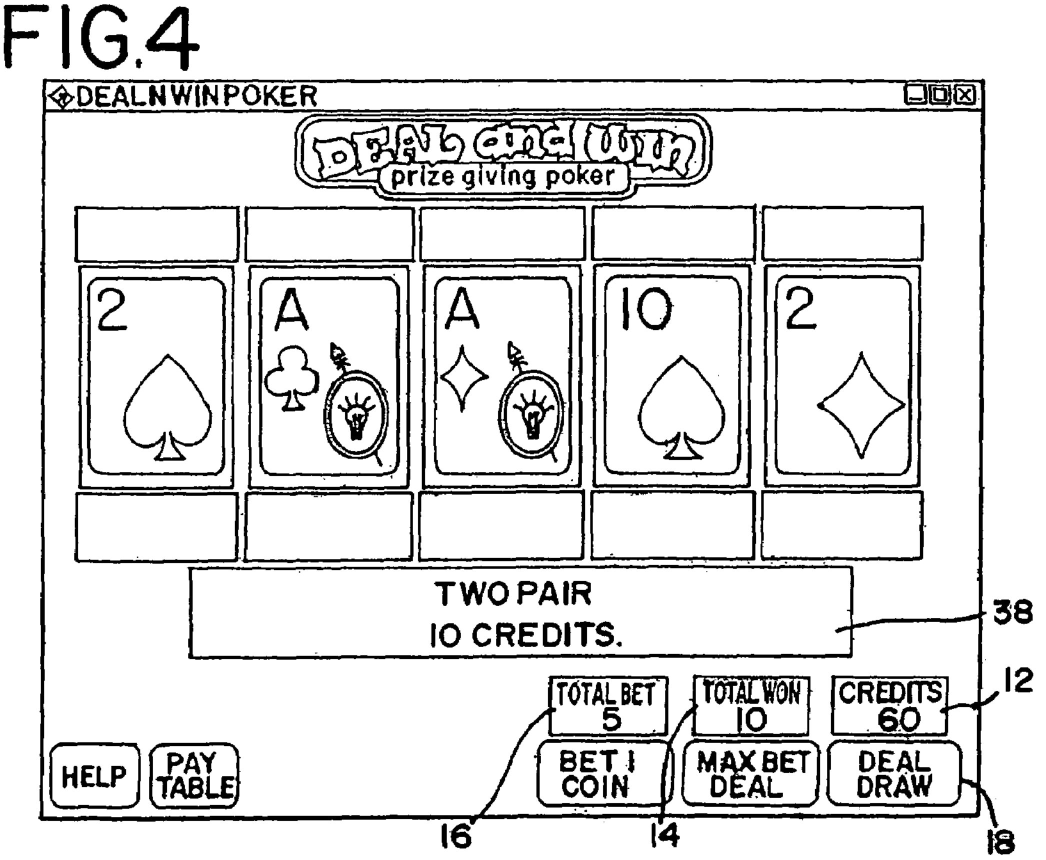

FIG. 4 shows one possible outcome after the draw of the hand of FIGS. 2 and 3. The three cards that were not held are replaced using the RNG to select three cards from the remaining forty-seven cards of the fifty-two card deck. This method of dealing cards for draw poker is well known by those skilled in the art.

After the draw, the hand is evaluated and paid from an imbedded paytable, such as shown in Table 1. The winnings are determined by the highest paytable value achieved, and then multiplied by the value indicated in the "Total Bet" meter 16. From Table 1 it can be seen that the highest paytable value for this hand is Two Pair. The two credit award for Two Pair is multiplied by the five credit bet for a total ten credits won. The game shows the "Two Pair 10 credits" in box 38 indicated under the cards. The "Total Won" meter 14 is updated to indicate "10" credits. The ten credits are added to the "Credit" meter 12, taking the total number of credits from 50 (as an arbitrary start) to 60.

Figure 5:
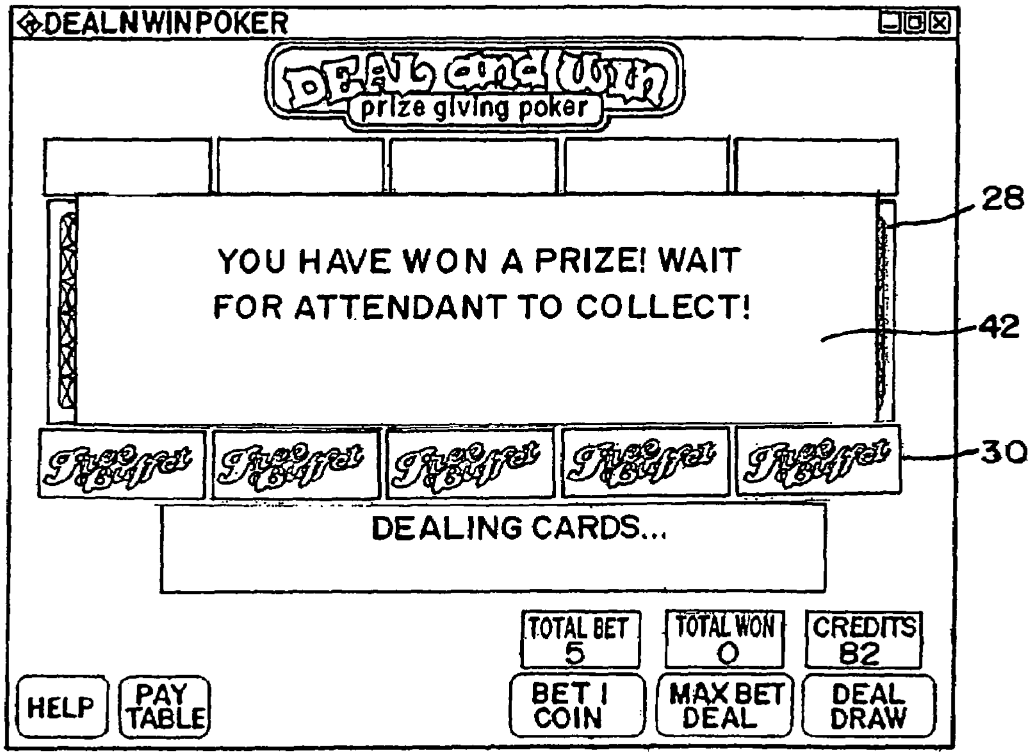

FIG. 5 shows the deal of another hand where all five bonus award values 30 shown on the card backs 28 have the value of "Free Buffet". The player has therefore won a "Free Buffet" award. In this embodiment, when the player receives an award on the deal, the game enters a "lock up" state where it displays a winning message 42 on the screen (which otherwise displays the cards) to inform the player that he or she has won an award that will be delivered by an attendant. Once the game enters the "lock up" state, the game will not allow further play, insertion of money, or cashing out. It is "locked up" with this winning message 42 on the screen until an attendant uses a reset key, or opens up the machine to release the game from this state. This is the same type of procedure that is used to pay large awards that must also be handled by an attendant (so-called "hand-pay") and is well known by those skilled in the art. The attendant presents the player with the award, which in this case is a voucher entitling the player to a meal at the buffet. The attendant may also make a written record of the award on paper contained inside the slot machine, as is well known in the art. It is not important to the invention how the attendant releases the game from the lock-up state, or even that it enters a lock-up state, as will be evident hereafter, if not already appreciated.

Figure 6:
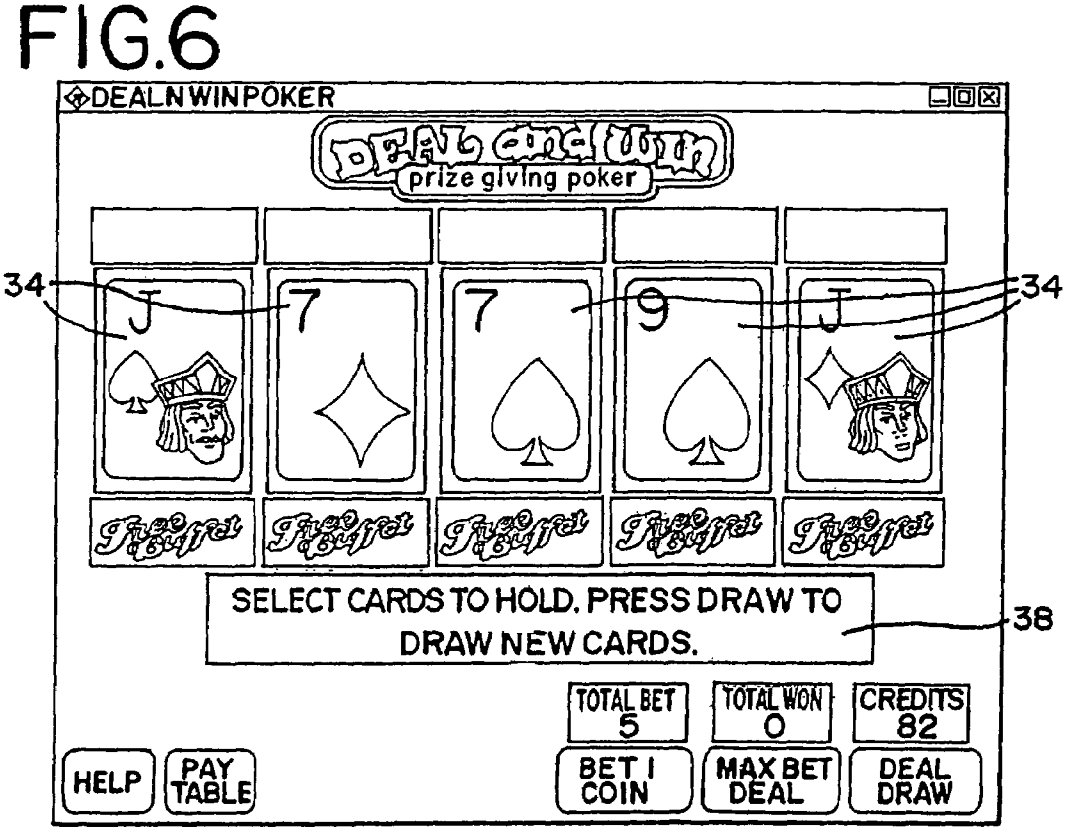
Figure 7:
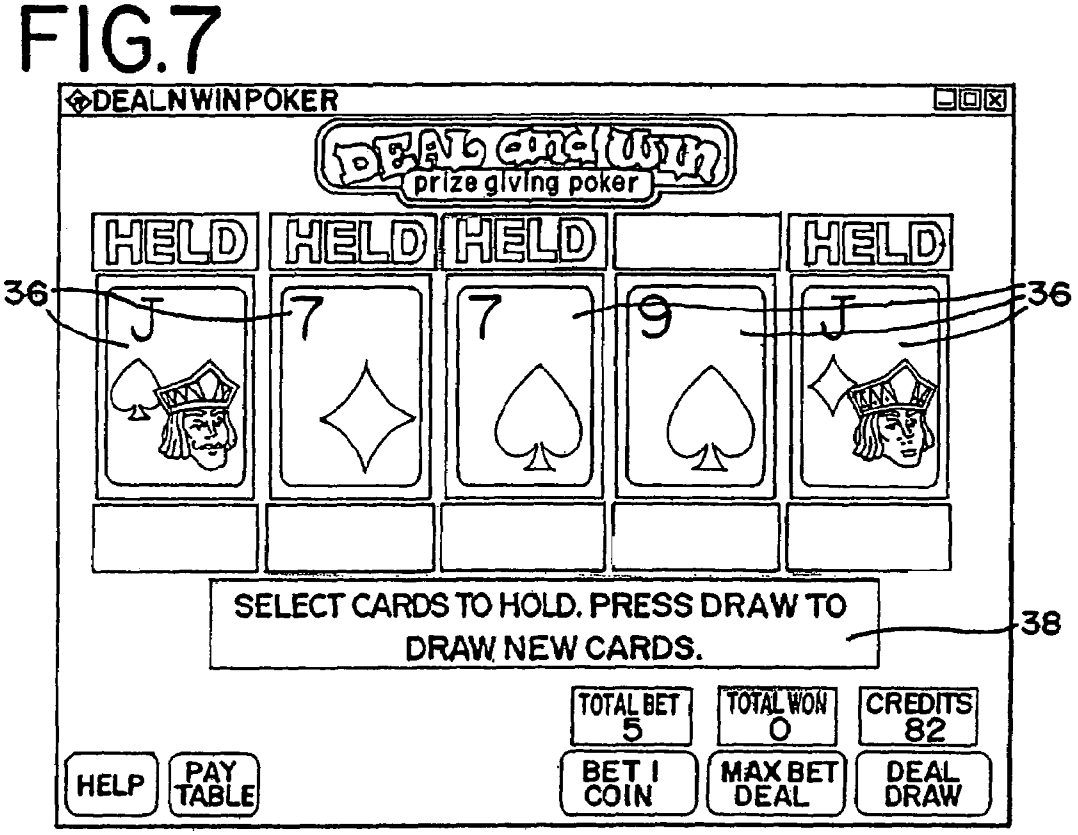

Once the attendant has released the game, the card faces 34 are now revealed to the player for the hand that was dealt, and play continues. For the game dealt in FIG. 5, the card faces are shown in FIG. 6. As in FIG. 2, the bonus award values 30 stay until the player holds a card or presses the "Deal/Draw" button 18 whichever occurs first. FIG. 7 shows the player holding the pair of jacks and pair of sevens, as indicated by the "Held" indicator 36 over the four cards. The bonus awards have now been removed.

Figure 8:
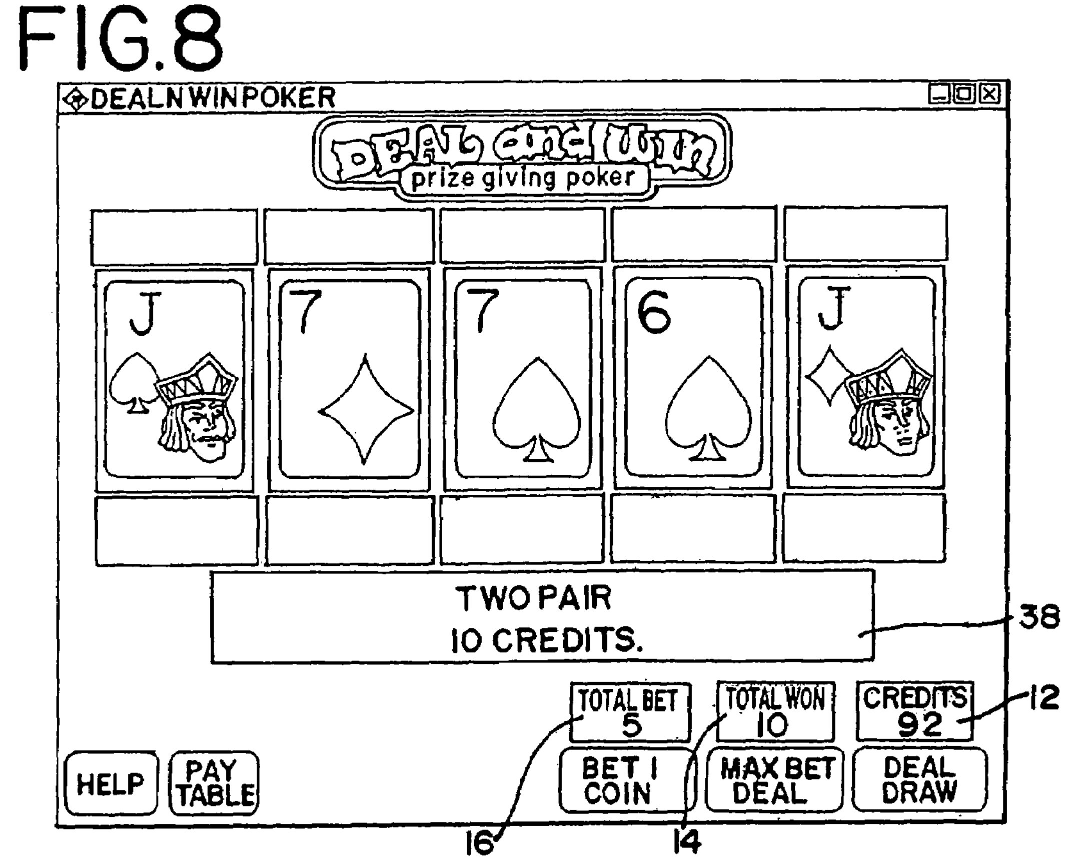

FIG. 8 shows one possible draw to this hand. In FIG. 8, the payout of the resulting hand is Two Pair, with a payout value of two (from Table 1). The payout value is multiplied by the five credits wagered, as indicated in the "Total Bet" meter 16. The winnings are indicated by "Two Pair 10 credits" in box 38 and the "Total Won" meter 14 is updated to reflect "10" credits. This amount is then added to the "Credit" meter 12, resulting in a new total of 92 credits.

In another embodiment, the gaming machine is outfitted with a printer that is capable of printing out a coupon or ticket redeemable for the specified award. This eliminates the lock-up state and need for any hand-pay. The printer may be outfitted in various configurations, including those described in U.S. Pat. Nos. 5,505,449 to Eberhardt et al. and 6,048,269 to Burns et al. The gaming machine may be equipped with a printer for the sole purpose of printing out award tickets, or the gaming machine may use a printer that is part of a cash printout system. In any case, the operation of a game equipped with a printer is identical to the operation described above until a "Deal and Win" award is won. When a "Deal and Win" award is achieved, instead of showing a screen like the one shown in FIG. 5, the gaming machine puts up a similar display indicating that the award has been won and that a ticket is being dispensed that is redeemable for the award, or alternatively, simply prints out the ticket. At this point the player may touch the screen or any button to continue the game in progress, which will result in the display of a screen as shown in FIG. 6. The player may redeem the coupon/ticket at the cashier, at a slot club booth, or at a special location for merchandise redemption. The specifics of how the coupon is redeemed are not critical to the invention, and these pay-out methods are well known in the art.

Figure 9:
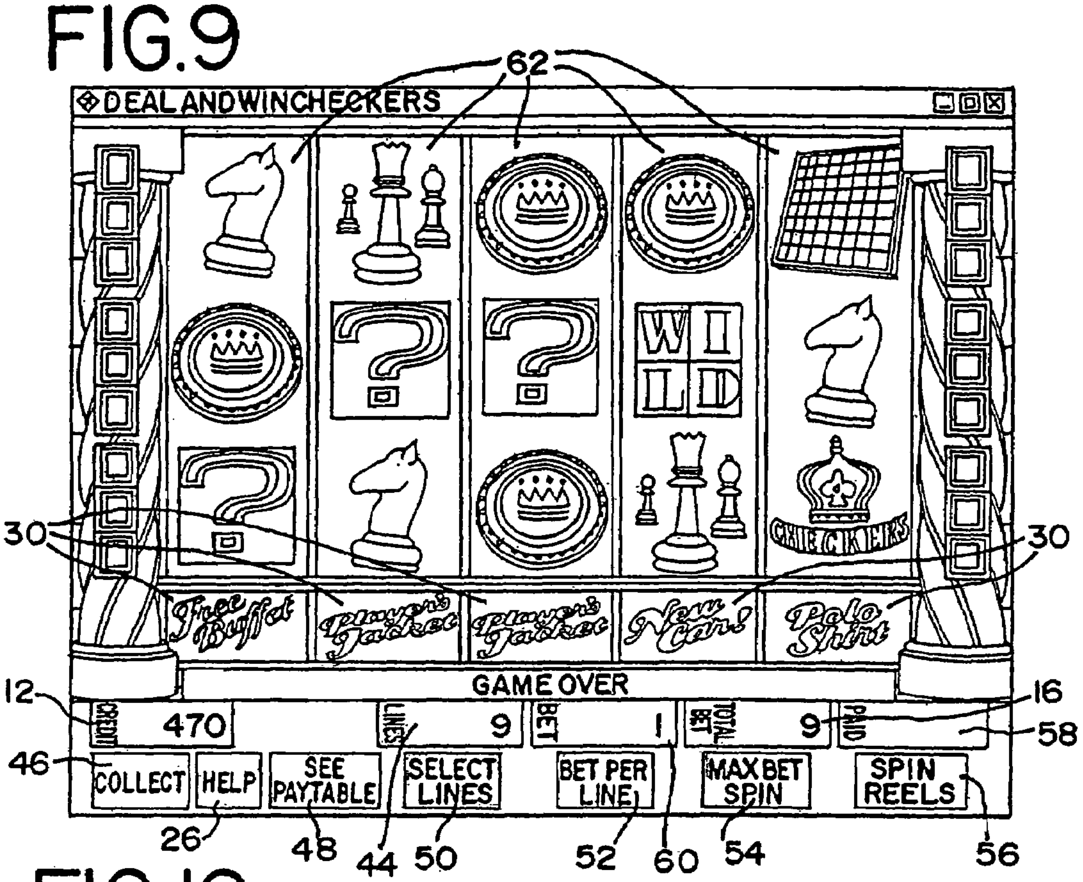
FIGS. 9 through 12 are screens from a video display showing another embodiment of the invention.

While this award game has been shown in conjunction with a poker game, it is adaptable to other types of games. For example on a slot machine, the bonus award values 30 could be placed near each reel as shown in FIG. 9. When the reels 62 of the slot game are spun, the bonus award values 30 spin as well. As the reel 62 "stops", an award on that particular reel is also revealed.

FIG. 9 shows various meters and buttons of a "Deal and Win" slot game including a "Lines" meter 44, a "Credit" meter 12, a "Collect" button 46, a "Help" button 26, a "See PayTable" button 48, a "Select Lines" button 50, a "Bet Per Line" button 52, a "Max Bet Spin" button 54, a "Spin Reels" button 56, a "Paid" meter 58, a "Total Bet" meter 16, and a "Bet" meter 60. This embodiment employs a five reel multi-line slot game as the first (primary or base) game.

A player actuates the "Select Lines" button 50 to indicate the number of lines to be included in the wager of the game, ranging from one to nine lines. The player can actuate the "Bet Per Line" button 52 to indicate a bet for each line wagered upon, ranging from one to five coins. Here, the player has selected to play the "Deal and Win" slot game betting all nine lines at one credit per line. This comes to a total bet of nine credits, as displayed on the "Total Bet" meter 16. The player then actuates the "Spin Reels" button 56 to start the game and spin the reels 62. As an alternative to all of the foregoing button pushing, the player may instead actuate the "Max Bet Spin" button 54 to establish a bet of five credits per line for nine lines and initiate the spin of the reels 62. The maximum coin bet on the game of five credits per line for nine lines is arbitrarily chosen, and plainly may be made smaller or larger without departing from the invention. The nature of the primary game is incidental to the invention, unless otherwise indicated herein.

Figure 10:
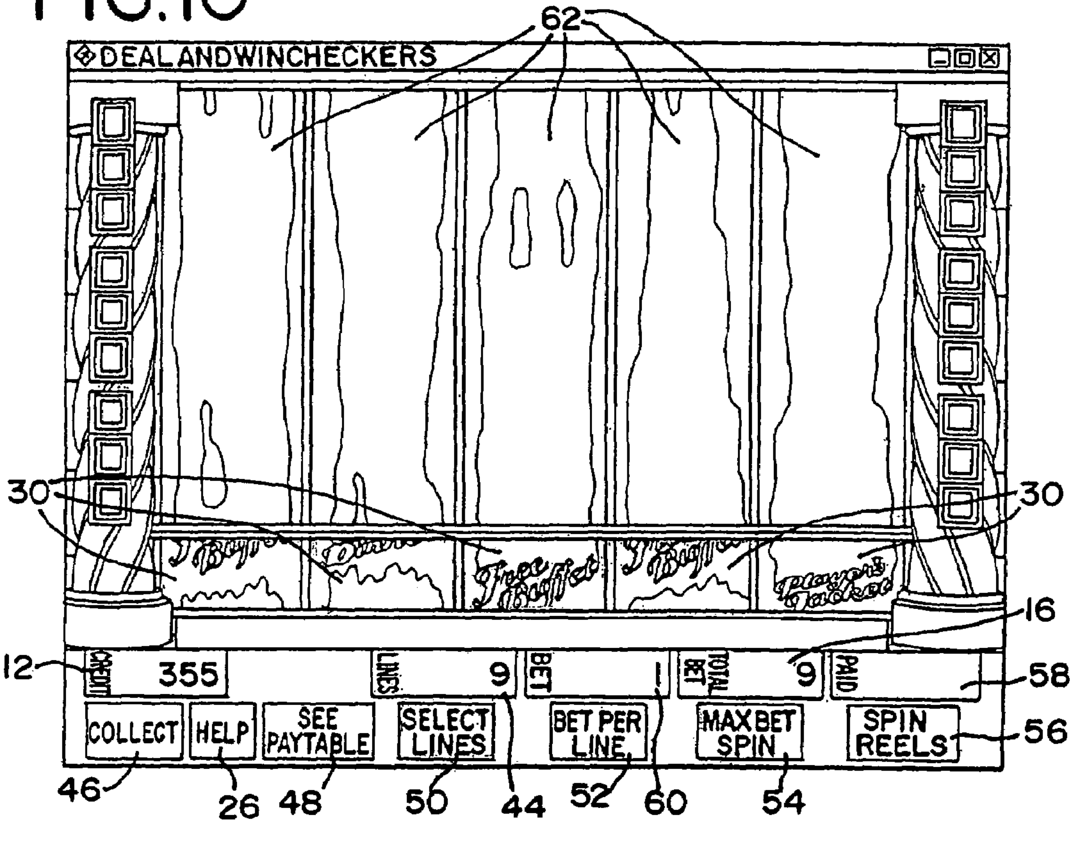

Once the player actuates either the "Spin Reels" button 56 or the "Max Bet Spin" button 54, the well known RNG is used to establish "stop" positions for the five reels 62, which are meanwhile shown spinning in a video display format, as shown in FIG. 10.

The bonus award values 30 are also selected by the RNG and shown to "spin" as well as the reels 62. Here, the game spins the reels 62 and the bonus award values 30 at the same time.

Figure 11:
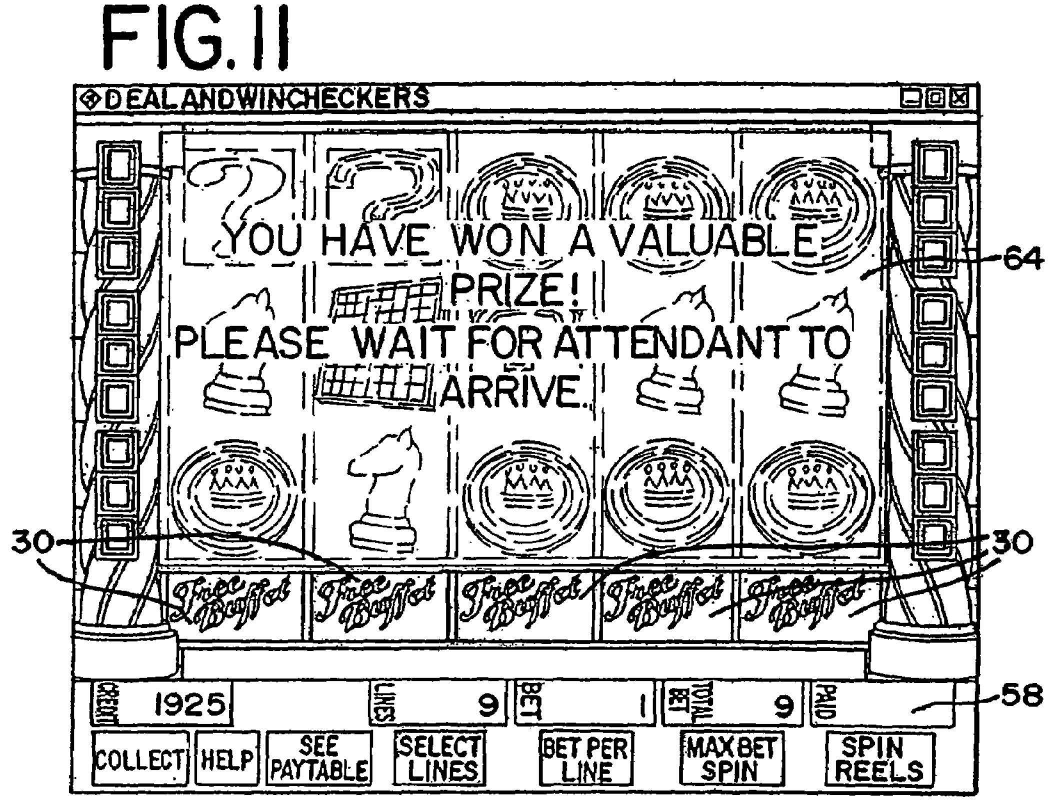

The game "stops" the spinning reels 62 and bonus award values 30 at positions and values selected by the RNG, shown in FIG. 11. This method of displaying spinning the reels and establishing the positions for a slot game is well known by those skilled in the art.

Here, as fate and this particular disclosure have determined, the player receives five matching bonus award values 30 of "Free Buffet", and the player wins an award of a free buffet. In this embodiment as shown in FIG. 11, when the player receives an award on the spin, the game enters the aforementioned "lock up" state where it displays a winning message 64 on the screen, to let the player know an award will be delivered by an attendant.

After the attendant presents the player with the award, which in this case is a voucher entitling the player to a meal at the buffet, the attendant will then use a reset key which is placed in a lock on the outside of the cabinet, or will open the cabinet and reset the lockup condition allowing the game to continue. The attendant may also make a written record of the award on paper contained inside the slot machine as is well known in the art.

Figure 12:
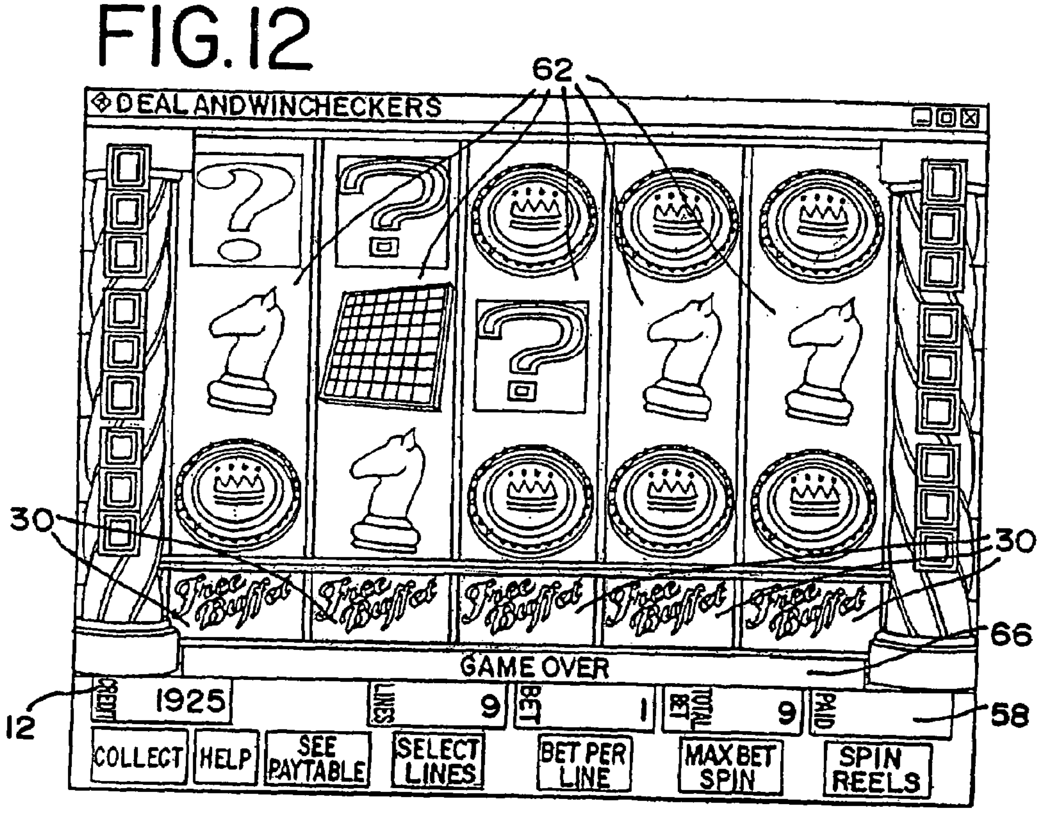

Once the attendant has released the game from the lockup state, the slot game will return to the display of the reels 62 for the game underway and play continues as shown in FIG. 12. Any payout of the slot game is determined for all lines that were bet, with the resulting payout value then multiplied by the number of credits per line wagered, and the winnings are then shown in the "Paid" meter 58. This amount is then added to the "Credit" meter 12.

FIG. 12 shows one possible outcome of the game shown in FIGS. 9, 10, and 11. After the reels stop, the end results are evaluated and paid from an imbedded paytable.

A Keno game could also employ this invention by either selecting an award "ball" after each of the traditional Keno balls is drawn, or by having a bonus value award associated with each Keno ball displayed in some other fashion (not shown). A player may choose to bet on any number of 'spots' (up to fifteen) for the price of one ticket. The more spots the player correctly predicts, the higher the payout, and the bonus value award could likewise improve in terms of odds as more values are revealed in conjunction with correct spots. Similarly, awards could be associated with the cards of other card games such as Blackjack or Pai Gow Poker, in like manner to that described herein, or in other games and variations that still employ this invention.

Figure 13:
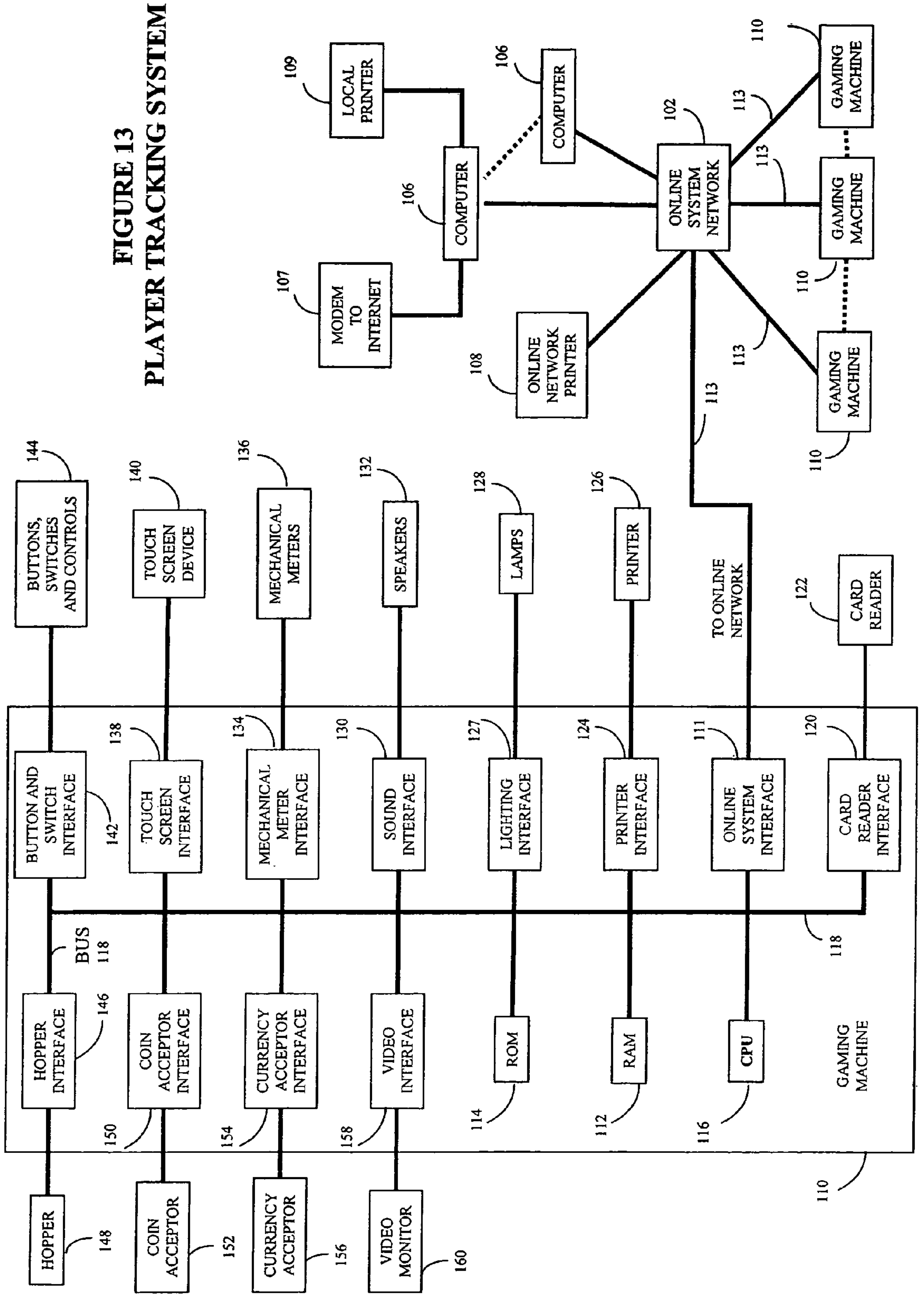
FIG. 13 is a schematic diagram of certain components of a system used in accordance with the invention.

In one such variation, the awards are credited to a player's account with the gaming establishment or other game operating entity electronically. A local area network (LAN) allows player data, win/loss information, electronic funds transfer data, and other information to be interfaced to a gaming operator's computer system. FIG. 13 is a block diagram of such a player tracking system, which also incorporates a remote printing capability (for hand-pay among other things) as well as for printing at the gaming machine. It is used to administer "slot clubs" and other electronic programs, and is in generalized fashion well known by those skilled in the art. This embodiment of FIG. 13 has however been modified, as will be now readily seen.

In this networked embodiment, the secondary game award is made available just to players that have a player card for the online system. This would give an advantage to players using a player card, and in addition to the basic novelty of this invention alone, could be used to promote use of the player card. That is, players using the player cards would be eligible for these extra awards, while players without cards would lose out on the opportunity for awards other than those presented in the primary or base game.

The operation of this embodiment as a card game or slot game would be similar to that described above, with the exception that award values would not be shown at all to players that do not insert a player tracking card. One could, of course, have the award values shown to ineligible players, but this could well engender confusion as well as negative feelings if an award would otherwise have been earned. Once a "Deal and Win" award is won by the eligible player, a display shows the player that he has won the award, and that it has been credited to the player's account. The player would then touch the screen (or press a button) to continue the game.

As shown in FIG. 13, one form of this embodiment of the present invention includes a player tracking system 100 having an online system network 102 operated on a local, or even wide area network. The local or wide area network of the online system is contained in box 102. A modem 107 could be used for far-flung Internet gaming. The system network 102 is controlled and operated on one or more network computers 106. The network computer is also connected to a local printer 109. The system network 102 is connected to an online network printer 108, and a plurality of gaming machines 110. Each of the plurality of gaming machines 110 interacts with the online system network 102 via an online system interface 111 and communications link 113. This could be at one or more sites, or through Internet linkage virtually anywhere.

Each gaming machine of the plurality of gaming machines 110 comprises a random access memory (RAM) 112 and a read only memory (ROM) 114 connected to a central processing unit (CPU) 116, with an electronic bus 118. A card reader interface 120 and a card reader 122 are used for the player wager input to actuate the bonus award secondary game. A printer interface 124 and a printer 126 additionally are available at the gaming machine. Other standard features in the form of a lighting interface 127, lamps 128, a sound interface 130, speakers 132, mechanical meter interface 134, mechanical meters 136, a touch screen interface 138, a touch screen device 140, a button and switch interface 142, buttons and switches 144, a hopper interface 146, a hopper 148, a coin acceptor interface 150, a coin accepter 152, a currency acceptor interface 154, a currency acceptor 156, a video interface 158, and a video monitor 160 are provided. Residing within the main memory is an operating system. The CPU 116 operates the individual gaming machine 110 utilizing the programs of the RAM 112 and the ROM 114.

Each of the plurality of gaming machines 110 and the network computer 106 are constructed and programmed such that a player operates one of the plurality of gaming machines 110 by entering a player card into the card reader 122, which is then read by the network computer 106, to identify the player and a player's bet or wager history by the online system network 102. The base game of chance is then played, with wagering of a bet by the player for playing the base game. The secondary game of chance of matching bonus values is then played in conjunction with the base game of chance, since this embodiment makes the slot club card-carrying eligible for the same. Crediting any winnings won by the player based upon the outcome of the base game of chance or registering any losses then occurs, with the award of anything won by the player based upon the secondary game of chance.

Variations of this embodiment of FIG. 13 would include presenting any award won to the player by presenting the award to the player at the gambling machine 110 by hand, or by printing a voucher or a ticket for the award with the printer 126.

Expanding beyond FIG. 13 above, the above ways that are used to award bonus prizes may be combined in any manner. For example the coupon/ticket printer may be combined with the attendant award (hand-pay) such that a ticket is normally printed, but an attendant is summoned should the printer malfunction or run out of paper. The card reader version could be combined with the ticket version such that the prize is put on the players account if a player-tracking card is registered, however a ticket is printed out if no card is present (where eligibility is not limited to card members). All embodiments could be combined with a prioritized method of distribution (such as award to account if card is present, otherwise try to print a ticket, otherwise summon an attendant). Instead of a prioritized method the player could be allowed to select how the prize is awarded.

In another embodiment using a player card, the gaming machine could offer awards of slot club points, or other loyalty program awards, instead of the tangible awards illustrated in the Figures. In this embodiment as applied to a draw poker game of the first illustrated embodiment, the awards could be different numbers of slot club points that are awarded to the player's account when the award is won. The operation of this embodiment would be exactly like the embodiment that credited an award to the player's account, except that the specified number of slot club points would be added to the player's balance. This embodiment could also require use of a player card to display the award values and thus dispense these slot club point awards. This embodiment could likewise be combined with the tangible prize embodiments allowing the player (that has inserted a player tracking card) to choose whether to get a tangible award or slot club points, or to allow certain awards to be slot club points while other awards are tangible prizes.

In another variation along the same lines, the award is in the form of gift points printed on a ticket. The different awards would be different amounts of gift points, or items representing gift point amounts (e.g. a toaster worth 20 gift points, a blender worth 35 gift points, a food processor worth 100 gift points etc.). Each time an award is won, a ticket would be dispensed indicating the number of gift points. The player could combine gift points to redeem for cash or merchandise at a redemption counter, or automatic merchandiser. Items could likewise be valued and traded for other items on a gift point basis. Table 2 shows gift point values that may be assigned to the merchandise of the first embodiment described above. Using this table, it can be seen one could trade three buffets for one Polo Shirt, or two Steak Dinners for one Jacket. You could also trade one Steak Dinner for one Polo Shirt and two Buffets, or one Jacket for two Steak dinners (i.e., you can trade down as well as trade up). The ability to trade merchandise is unaffected by whether the merchandise is presented in its physical form, a redeemable ticket, or in an electronic account. The awarding of gift points may be done through credit to the players' slot club account instead of, or in addition to, the printout of paper vouchers.

TABLE 2

| Award | Gift Point Value |
|---|---|
| Car | 1500 |
| Jacket | 10 |
| Steak Dinner | 5 |
| Polo Shirt | 3 |
| Buffet | 1 |

While a very attractive attribute of the invention in the foregoing embodiments is to provide a way to add merchandise and other non-cash awards to a base game, particularly one played on a gaming machine, awards could also be cash or credit awards. That is, instead of tangible awards (things), the awards could be different number of game credits or items that represented game credits (e.g. a toaster worth 20 credits, a blender worth 35 credits, a food processor worth 100 credits, etc.). When an award is won, the number of credits for the award is added to the credit meter, and cashed out as coins to the player or credits, or added to the player's account.

The "Deal and Win" secondary game could also be made as a means to achieve a bonus game sequence. Upon the correct combination of awards in the "Deal and Win" game, a bonus game would be awarded to the player, with a chance to win cash, credit or merchandise. Such bonus games are well known adjuncts to a primary or base game. A single bonus game could be available or different bonus games could be available depending on the match in the "Deal and Win" game. The bonus game award or awards could be used alone or combined (as available awards) with any of the other possible awards discussed.

Returning now to the first embodiment described, another version would not remove the award values when the player requested a hold or draw. Instead, the bonus award values 30 would remain with the held cards and a prize would be awarded if winning combinations were present after the draw, where the newly drawn cards also have new award values established by the RNG. There may be situations in this variation where the best play for the player is considered to be to hold a set of cards containing a certain award desired, notwithstanding that a different combination may be expected to yield a better poker hand and payout.

Figure 14:
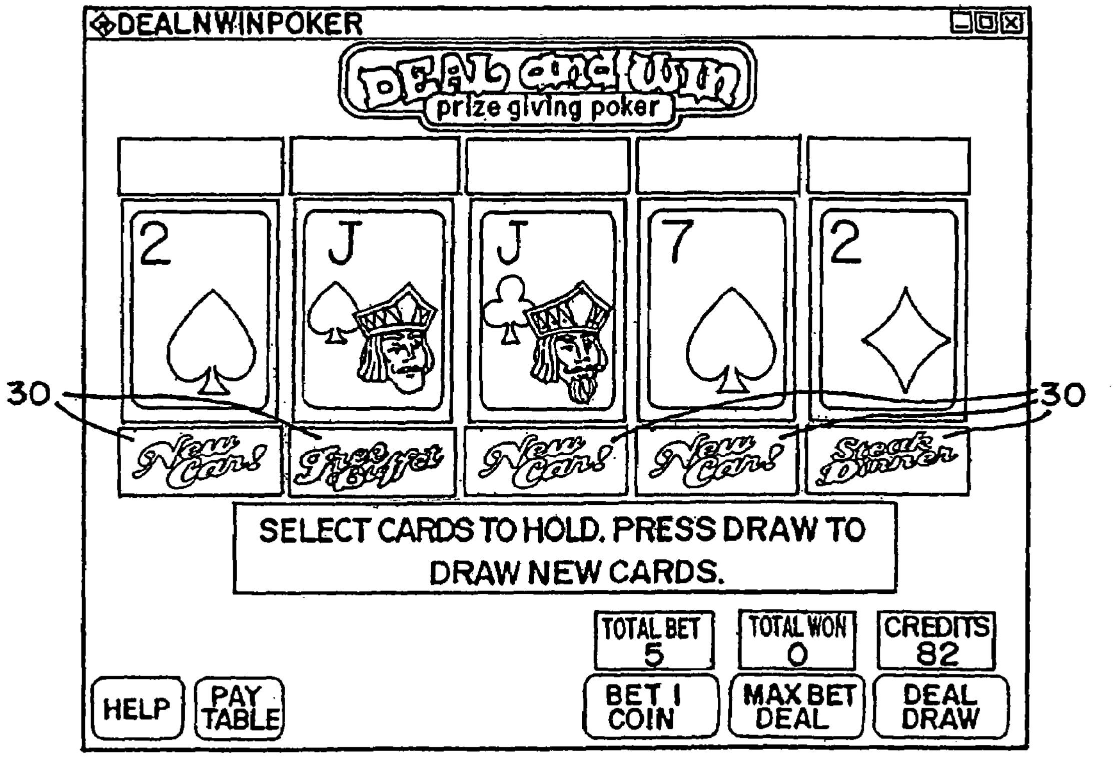
FIGS. 14 and 15 are screens from a video display showing another embodiment of the invention.

Looking at FIG. 14, "New Car" appears in three of the award locations 30. The player, desiring a new car, then elects to hold the two of spades, the seven of spades, and the jack of clubs, to thereby hold the three "New Car" award indications. The player is thus foregoing a sure Two Pair, and eliminating the potential for a Full House in the base game.

Figure 15:
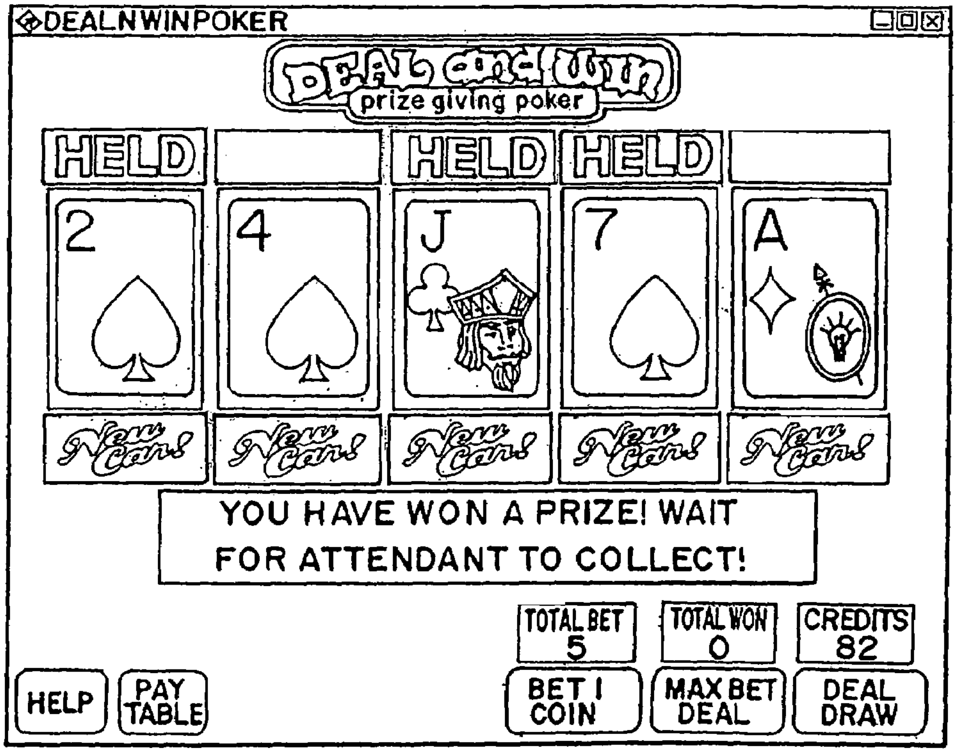

FIG. 15 reveals one possible outcome, where the player luckily achieves the award of a new car, even though the hand in the base game is now not a winning hand.

Any of the conceivable embodiments may be combined with multi-hand games, such as the poker games described by Moody in U.S. Pat. No. 5,823,873 or in the application of Slomiany, Ser. No. 09/709,922, entitled "Multi-Strike Game", filed on Nov. 11, 2000. These configurations could apply the award values to only the initial deal, or in the case of an ascending series of games, could be offered as each stage begins to play. A multi-hand game could hold and draw award values as shown in FIGS. 14 and 15 on every hand.

Figure 16:
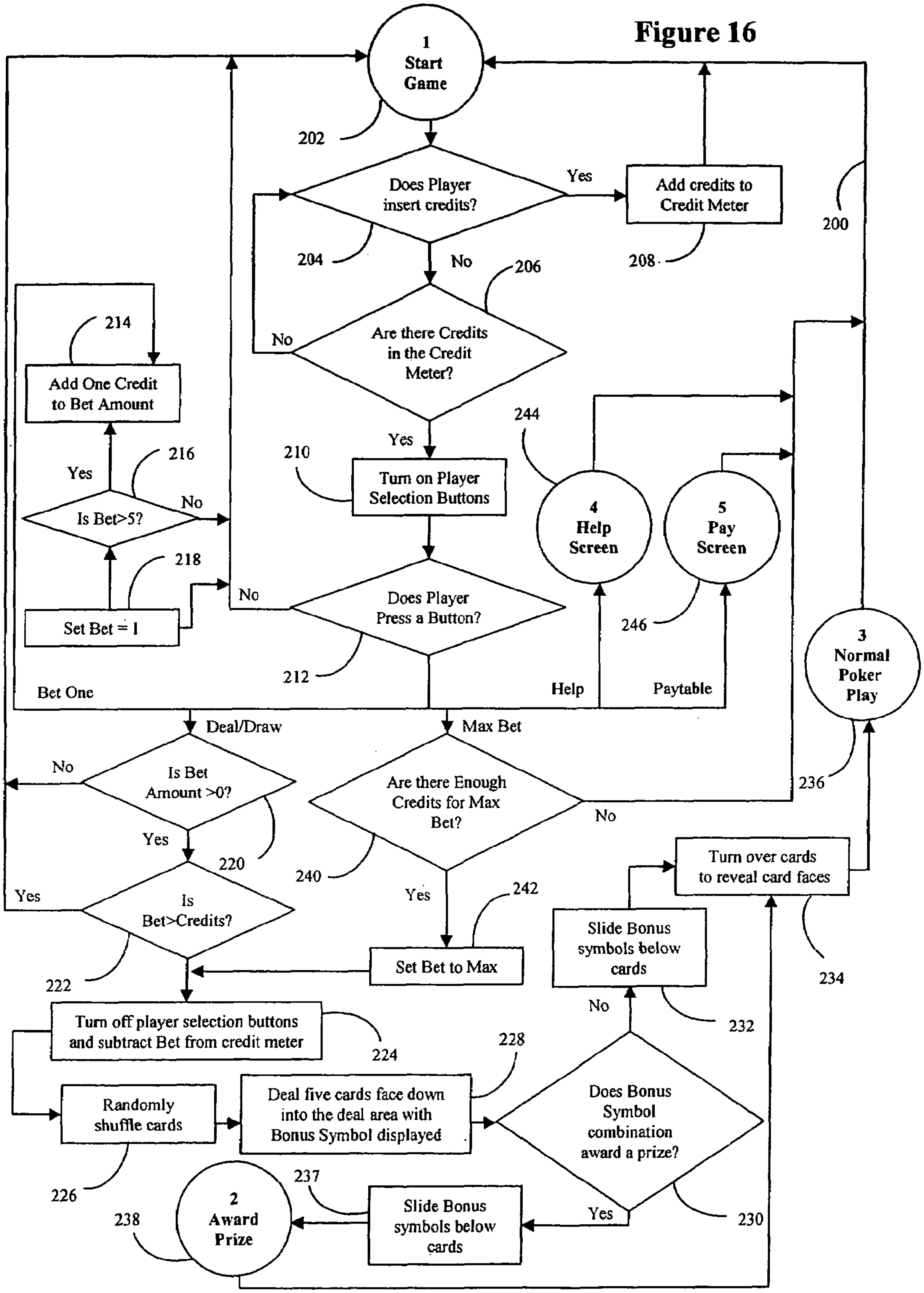
FIGS. 16 through 21 are flow charts for a computer program for operating an embodiment of the invention.

One form of the above-described embodiment of a "Deal and Win" game in a single player format to be used or operated on an independent computerized gambling machine with a display is operationally summarized in the flow charts of FIGS. 16-21. FIG. 16 generally describes a main loop 200 of the game.

The first element of the main loop 200 is the start of the program at step 202. Next, the program determines if any credits (coin, a dollar bill, a credit card) were applied to the machine by a player at step 204. If credits were not applied (e.g., inserted) into the machine, then the program proceeds to step 206 and determines if any credits are displayed on a "Credit" meter. If credits were applied, however, the program would update the "Credit" meter at step 208 and then return the program to the main loop 200 at step 202.

As mentioned above, the program determines if any credits are displayed on the "Credit" meter at step 206. If no credits are displayed on the "Credit" meter, then the program returns to step 204. If credits are displayed on the "Credit" meter, then the program turns on the player selection buttons at step 210. The set of player selection buttons have been previously described, and includes a "PayTable" button, a "Help" button, a "Max Bet" button, a "Deal/Draw" button, and a "Bet 1 Coin" button. Next at step 212, the program determines if one of the plurality of player selection buttons have been actuated. If one of the player selection buttons is actuated, then the program proceeds to complete any steps initiated by that button.

If the player actuates the "Bet 1 Coin" button, then the program adds one credit to a bet amount and displays the amount in a "Total Bet" meter in step 214. Next in step 216, the program determines if the bet amount is greater than five. If the bet amount is not greater than five, then the program returns to the main loop 200 at step 202. If the bet amount is greater than five, then the program sets the bet amount to one and updates the "Total Bet" meter in step 218 and the program returns to the main loop 200 at step 202.

If the "Deal/Draw" button is actuated, the program determines in step 220 if the bet amount is greater than zero. If the bet amount is not greater than zero, then the program proceeds back to step 202, so that the player can then change the bet amount. If the bet amount is greater than zero, the program proceeds to step 222. Here, the program determines if the bet amount is greater than the value of the credits ("Credit" meter). If the bet amount is greater than the credits, the program again proceeds to step 202 so that the player can increment the bet amount or apply credits to the machine. If the bet amount is not greater than the credits, the program proceeds to step 224 to turn off the player selection buttons, and subtracts the bet amount from the "Credit" meter. The program randomly shuffles the "cards" of the program in step 226, then deals five cards to the player in step 228 with a "bonus award value" on the back of each card back.

In step 230, the program now determines if the combination of the bonus award values results in an award or a prize, per an imbedded table. If the combination of the bonus award values does not result in a prize, then the program proceeds to "slide" the bonus award values from the card backs to positions below the cards in step 232. The program turns over the cards to reveal the card faces of each card in step 234. The program then executes a "normal poker play" subroutine, described hereafter, to play the base game of poker in step 236. After executing the "normal poker play" subroutine, the program returns to the main loop 200.

If the combination of the bonus award values does result in a prize back in step 230, then the program proceeds to "slide" the bonus award values from the card backs to positions below the cards in step 237. After step 237 is completed, the program executes an "award prize" subroutine, described hereafter, in step 238. After executing the "award prize" subroutine, the program returns to complete step 234, and continues on from there as previously described.

If the player actuates the "Max Bet" button instead of the incremental "Bet 1 Coin" sequence, the program determines if there are enough credits to support the maximum bet of the game in step 240. If there are not enough credits to support the maximum bet, then the program returns the game to the main loop 200 at step 202. If there are enough credits to support the maximum bet, the program changes the bet amount to the predetermined maximum bet amount and displays the amount in the "Total Bet" meter in step 242. The program then executes step 224 and continues on from there, as previously described.

Staying with FIG. 16 for the moment, if the player actuates the "Help" button, the program initiates a "help" subroutine, described hereinafter, at step 244. After the program has completed the "help" subroutine, the program returns to the main loop 200 at step 202.

If the "PayTable" button is actuated, the program initiates a "pay screen" subroutine, described hereinafter, at step 246, to display a payscreen or paytable of the payouts for some possible results for different bet amounts. After the program has completed the "pay screen" subroutine, the program returns likewise to the main loop 200 at step 202.

Figure 17:
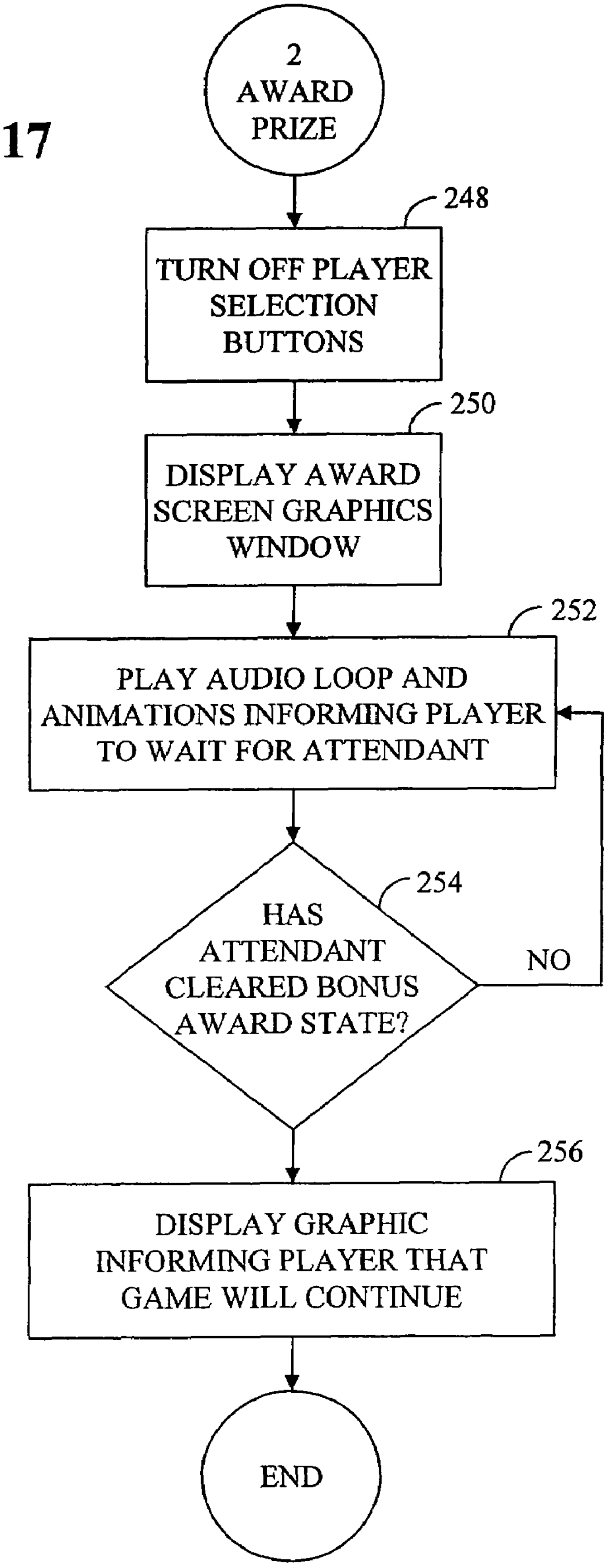

FIG. 17 describes the "award prize" subroutine referred to earlier as step 238 in FIG. 16. The "award prize" subroutine begins at step 248 where the program turns off the player selection buttons. In step 250, the program displays an award screen graphics window. Next in step 252, the program initiates a looping award state of audio and video sequences, calling an attendant and informing the player of the win and to wait for an attendant. In step 254, a determination is made if any attendant has cleared the award state. If the award state is not cleared, the program returns to step 252. If the award state is cleared, program displays a graphic informing the player that play of the game will resume in step 256. The program then returns to the main loop 200 to complete step 232 and continues from there as described above.

Figure 18:
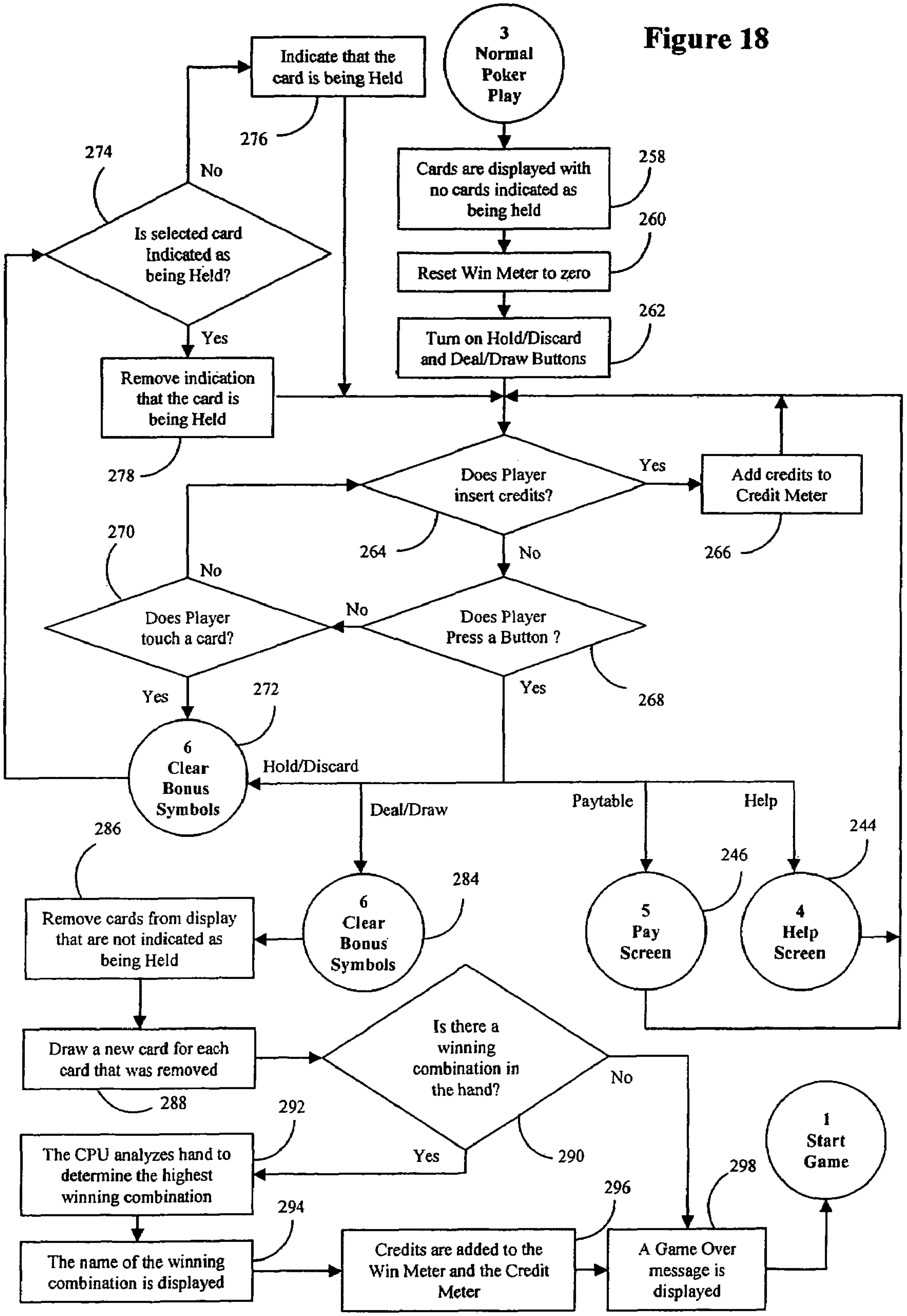

FIG. 18 describes the "normal poker play" subroutine, which is step 236 of FIG. 16. First in step 258, the five cards are displayed without any of the cards in a "held" state. In step 260 a "Win" meter is set to zero. In step 262, the program enables a "Hold/Discard" button for each of the five cards, as well as the "Deal/Draw" button. In step 264, the program determines if the player has applied any credits (coin, a dollar bill, a credit card) to the gaming machine. If credits were applied, the program would update the "Credit" meter at step 266 and then return the program to complete step 264 again. If credits were not inserted into the machine, then the program proceeds to step 268 and determines if the player has actuated any of the enabled player selection buttons.

If none of the player selection buttons are actuated, then the program proceeds to step 270 and determines if any of the cards have been "touched", indicating the cards are to be in a "held" state using a touch sensitive screen. If none of the cards are "touched," the program returns to complete step 264 described above. If any of the cards are "touched", then the program calls a "clear bonus symbols" subroutine, described hereafter, in step 272. Then in step 274, the program determines if the card that was "touched" is already in the "held" state in the game. If the card is not already in the "held" state, then the card is illuminated with a "held" indicator in step 276. If the card is already in the "held" state, then the "held" indicator of the card is un-illuminated in step 278. After completion of either step 276 or step 278, the program returns to step 264 described above and continues on from there.

Referring back to step 268, if the player actuates the "Help" button, the program goes to the "help" subroutine, described hereafter. After the program returns from the "help" subroutine, the program returns to step 264 and continues from there.

If the player actuates the "PayTable" button, then the program proceeds to the "pay screen" subroutine, described hereafter. The program returns to complete step 264, and continues from that step.

If the player actuates the "Deal/Draw" button out of step 268, the program calls the "clear bonus symbols" subroutine, described hereinafter, in step 284, but from here, the program then removes the cards from the monitor that are not identified in the "held" state in step 286. Next in step 288, the program randomly replaces the cards that were removed using a RNG from the remaining forty-seven cards of the fifty-two card virtual deck.

In step 290, the program determines if there is a winning combination of the cards according to an imbedded paytable. If a winning combination of cards does exist, the CPU determines the winning combination for the highest payout in step 292. In step 294, the name and payout of the highest winning combination is displayed. The number of credits for the highest winning combination is then added to the "Win" meter and the "Credit" meter in step 296. A "Game Over" message is then displayed on the display in step 298, and the program returns to step 202 of FIG. 16, to start the process again.

Back in step 290, if there is no winning combination of the cards, the program proceeds directly to step 298 to display the "Game Over" message, and then returns to step 202.

Figure 19:
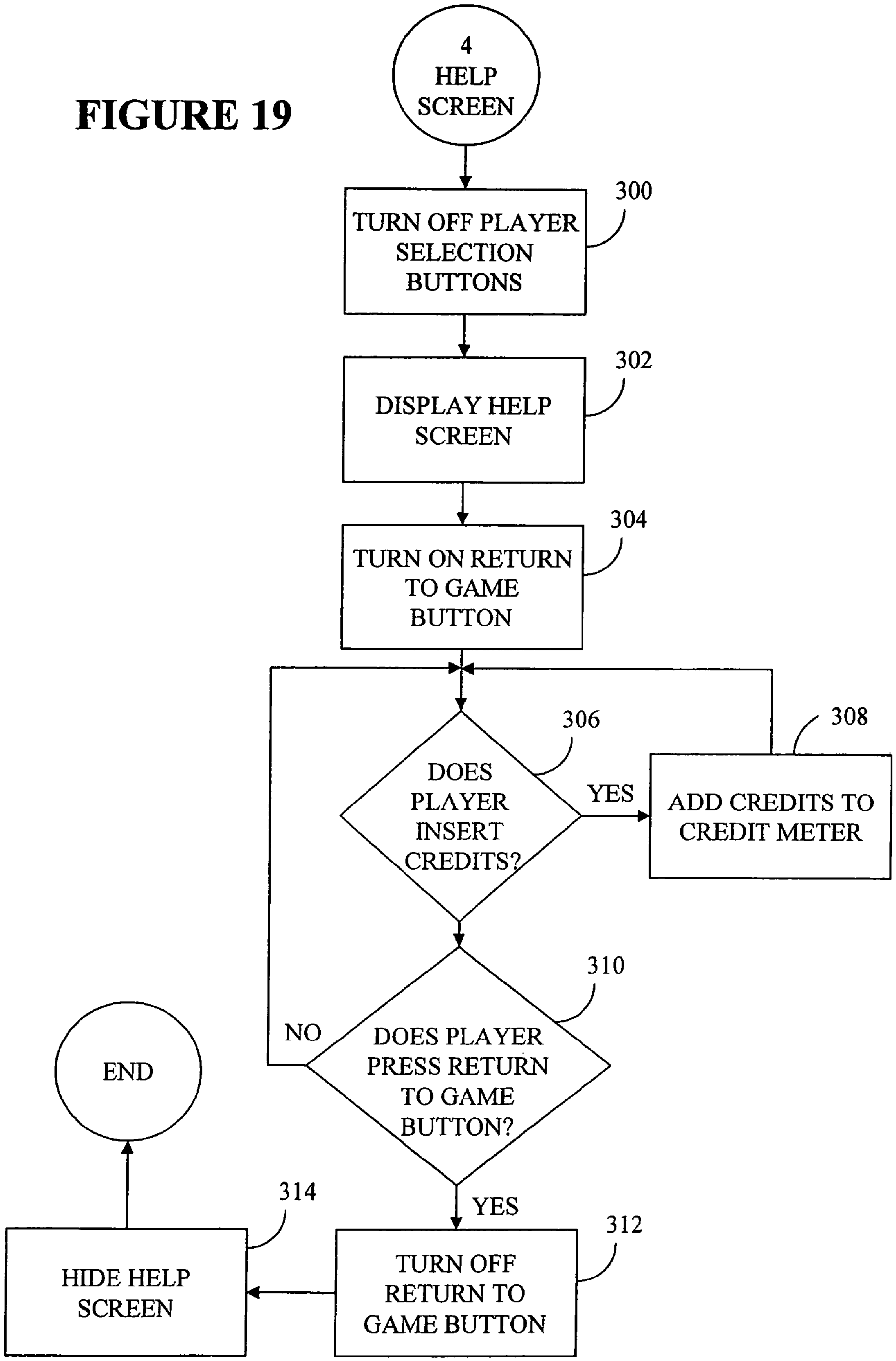

FIG. 19 depicts the "help" subroutine of step 244 of FIGS. 16 and 18. When the "help" subroutine is initiated, the program turns off the player selection buttons in step 300. In step 302, the program suspends the game, fades out the game on the display, and fades in a help screen. The program enables a "Return to Game" button in step 304. In step 306, the program determines if the player has applied any credits. If credits were applied, the program updates the "Credit" meter at step 308, and then returns the program to complete step 306 again. If credits were not applied, then the program proceeds to step 310 and determines if the player has actuated the "Return to Game" button. If the "Return to Game" button is not actuated, then the programs loops back to complete step 306 again.

If the "Return to Game" button is actuated, the program disables the "Return to Game" button in step 312. The program fades out the help screen and fades in the game on the display in step 314. Once step 314 is completed, the program returns to the point where the "help" subroutine was initiated.

Figure 20:
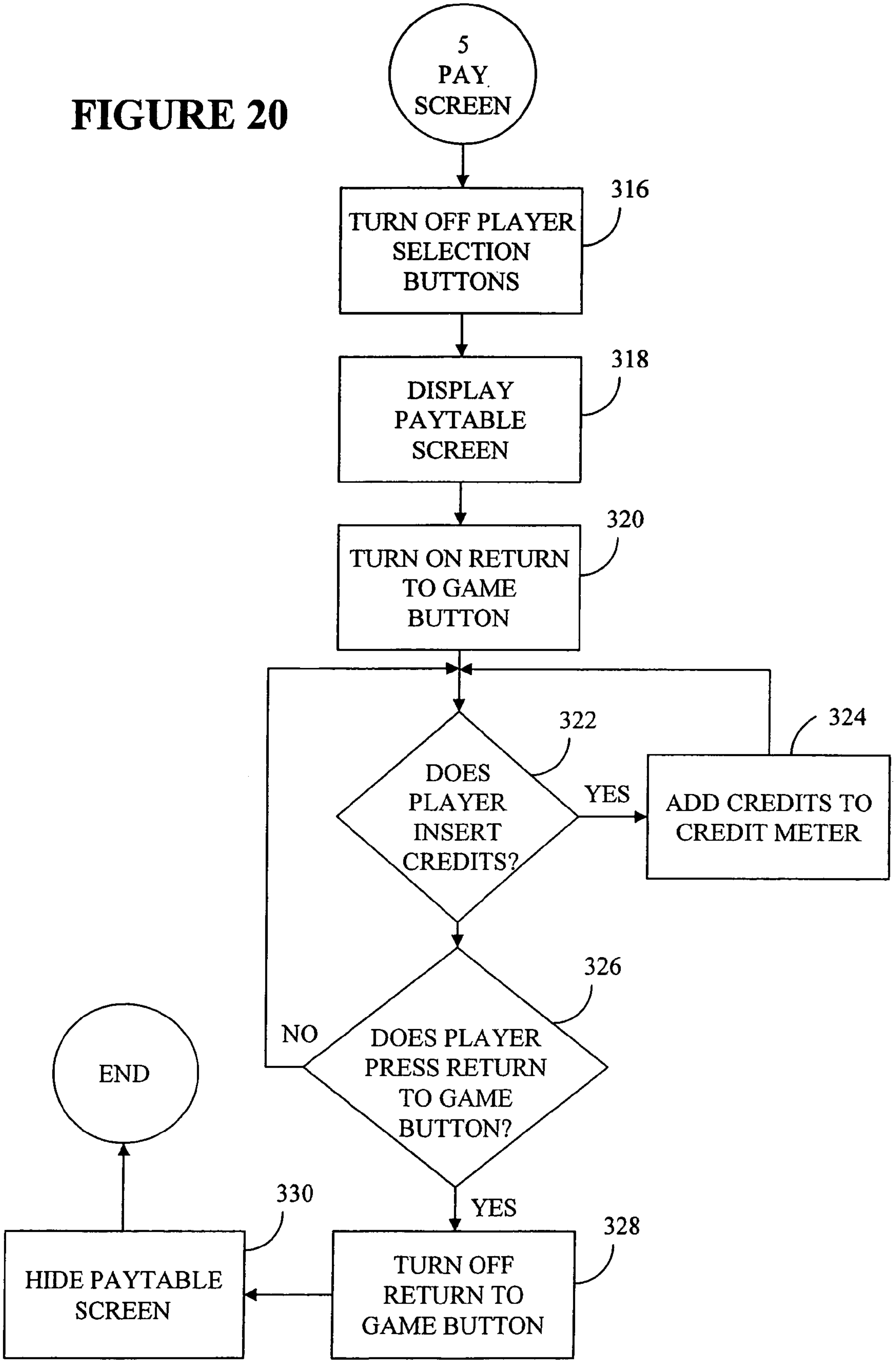

FIG. 20 depicts the "pay screen" subroutine of step 246 of FIGS. 16 and 18. When this subroutine is initiated, the program turns off the player selection buttons in step 316. In step 318, the program suspends the game, fades the game out on the display and fades in a paytable screen. The program enables the "Return to Game" button in step 320. In step 322, the program determines if the player has inserted any credits requiring an update of the "Credit" meter at step 324 and then if so, returns the program to complete step 322 again. If credits were not applied, then the program proceeds to step 326 and determines if the player has actuated the "Return to Game" button. If not actuated, then the programs loops back to complete step 322.

If the "Return to Game" button is actuated, the program disables the "Return to Game" button in step 328. The program resumes the game, fades out the paytable screen and fades in the game on the display in step 330. Once step 330 is completed, the program returns to where the "pay screen" subroutine was initiated.

Figure 21:
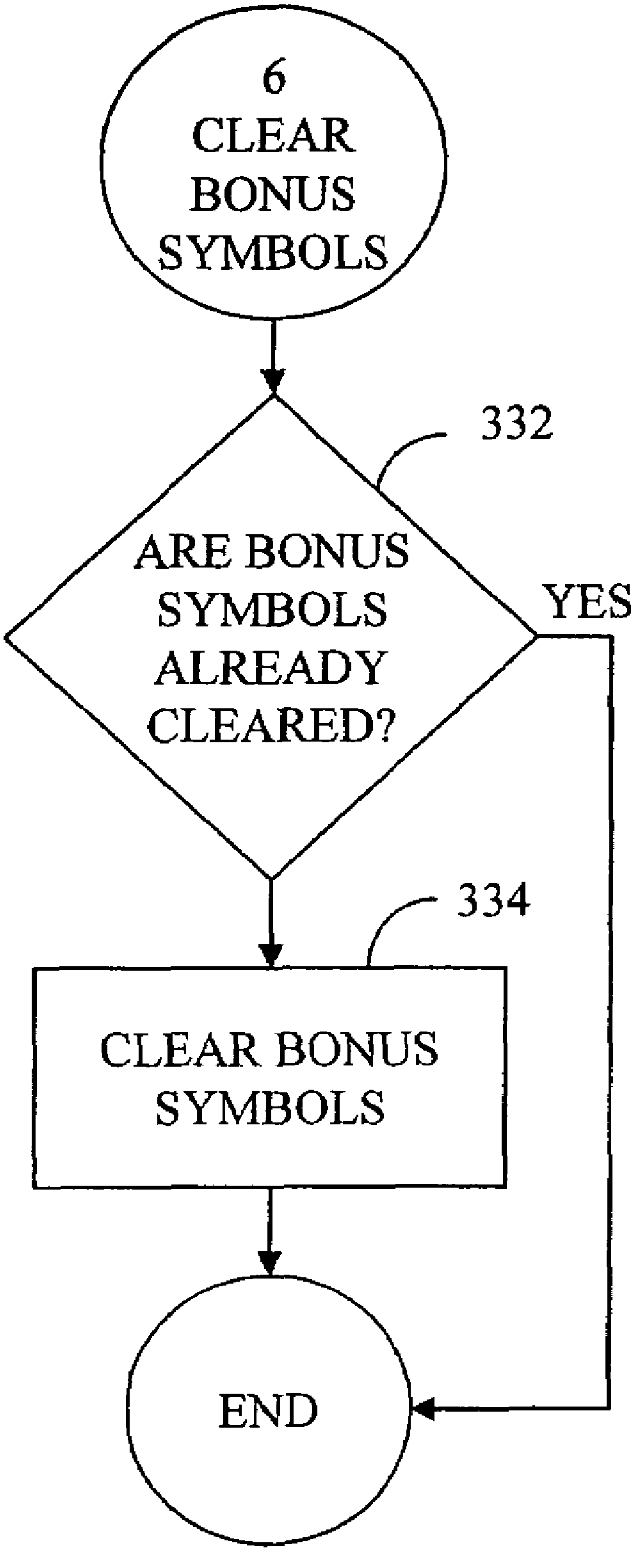

FIG. 21 depicts the "clear bonus symbols" subroutine of steps 272 and 284 of FIG. 18. When the "clear bonus symbols" subroutine is initiated, the program determines if the bonus award values are in a cleared or disabled state in step 332. If the bonus award values are in a disabled state, the program returns to complete steps 274 or step 286 depending on the origin of the subroutine call. If the bonus award values are in an enabled state, the program clears and disables the bonus award values in step 334. Once step 334 is complete, the program returns to complete steps 274 or step 286 as appropriate again depending on the origin of the subroutine call.

Analysis of a Poker Embodiment

The following example assigns a fixed award to each of the fifty-two cards. The embodiment being shown here requires that the award be won only when all five dealt cards contain the same award value.

The probability of any specific award will be determined by how many of the fifty-two cards contain that award. If all fifty-two cards contained the same award then the probability of getting a five card hand in which all five cards contained that award would be one. The fewest award cards for a given award that would still make it possible for the award to be won would be five cards. If there were only five cards for a particular award then the probability of being dealt a hand containing these five award cards is:

$$5/52*4/51*3/50*2/49*1/48=3.84769\,E\text{-}07 \text{ or } 1 \text{ in } 2{,}598{,}960.$$

This is the same probability as drawing any specific five card hand, such as a Royal Flush in hearts. Those skilled in the art can use this method to create Table 3 below.

Given the first column "N" cards in the fifty-two card deck specifying a given award, the second column shows the probability of getting dealt five cards with this award value from the fifty-two card deck, and is calculated as:

$$N/52*(N-1)/51*(N-2)/50*(N-3)/49*(N-4)/48.$$

The third column is the expected number of hands that will result in one award, and is computed as the reciprocal of the second column probability. For example, if there are sixteen cards for a particular award, then the probability of dealing that award on any particular hand is 0.001680672. This award will be given on average about once every 595 hands dealt.

TABLE 3

| Number of Cards with award value ("N") | Probability of 5 cards dealt all containing this award value | Expected number of hands until award |
|---|---|---|
| 5 | 3.84769E−07 | 2,598,960.00 |
| 6 | 2.30862E−06 | 433,160.00 |
| 7 | 8.08016E−06 | 123,760.00 |
| 8 | 2.15471E−05 | 46,410.00 |
| 9 | 4.84809E−05 | 20,626.67 |
| 10 | 9.69619E−05 | 10,313.33 |
| 11 | 0.000177763 | 5,625.45 |
| 12 | 0.000304737 | 3,281.52 |
| 13 | 0.000495198 | 2,019.39 |
| 14 | 0.000770308 | 1,298.18 |
| 15 | 0.001155462 | 865.45 |
| 16 | 0.001680672 | 595.00 |
| 17 | 0.002380952 | 420.00 |
| 18 | 0.003296703 | 303.33 |
| 19 | 0.004474097 | 223.51 |
| 20 | 0.005965463 | 167.63 |
| 21 | 0.00782967 | 127.72 |
| 22 | 0.010132515 | 98.69 |

TABLE 3-continued

| Number of Cards with award value ("N") | Probability of 5 cards dealt all containing this award value | Expected number of hands until award |
|---|---|---|
| 23 | 0.012947102 | 77.24 |
| 24 | 0.016354234 | 61.15 |
| 25 | 0.020442793 | 48.92 |
| 26 | 0.025310124 | 39.51 |
| 27 | 0.031062425 | 32.19 |
| 28 | 0.037815126 | 26.44 |
| 29 | 0.045693277 | 21.89 |
| 30 | 0.054831933 | 18.24 |
| 31 | 0.065376535 | 15.30 |
| 32 | 0.077483301 | 12.91 |
| 33 | 0.091319605 | 10.95 |
| 34 | 0.107064364 | 9.34 |
| 35 | 0.124908425 | 8.01 |
| 36 | 0.145054945 | 6.89 |
| 37 | 0.16771978 | 5.96 |
| 38 | 0.193131868 | 5.18 |
| 39 | 0.221533613 | 4.51 |
| 40 | 0.253181273 | 3.95 |
| 41 | 0.288345338 | 3.47 |
| 42 | 0.327310924 | 3.06 |
| 43 | 0.370378151 | 2.70 |
| 44 | 0.41786253 | 2.39 |
| 45 | 0.470095346 | 2.13 |
| 46 | 0.527424047 | 1.90 |
| 47 | 0.590212624 | 1.69 |
| 48 | 0.658841998 | 1.52 |
| 49 | 0.733710407 | 1.36 |
| 50 | 0.815233786 | 1.23 |
| 51 | 0.903846154 | 1.11 |
| 52 | 1.00 | 1.00 |

Next a cash value needs to be assigned to each of the possible awards. For this example the retail value of the award is being used. If the item has a lower wholesale cost to the operator, then the difference will increase the operator's profit on the game.

Table 4 shows the value of each of the five possible award items in this embodiment. It should be clear that more or fewer awards may be used without departing from the invention. Table 4 also shows the number of quarters (twenty-five cent coins) for this award value, since this embodiment is a game where each credit is worth twenty-five cents.

TABLE 4

| Award | Retail Value | Retail Value in Quarters |
|---|---|---|
| Car | $15,000.00 | 60,000 |
| Jacket | $100.00 | 400 |
| Steak Dinner | $50.00 | 200 |
| Polo Shirt | $25.00 | 100 |
| Buffet | $10.00 | 40 |

Table 5 is used to determine the percentage (of the amount wagered) that is returned through the "Deal and Win" awards. The first column shows the type of award. The second column shows the retail value of the award in quarters taken from Table 4. The third column shows the number of cards in the fifty-two card deck that contain the award specified in the first column. In this embodiment, this third column is made to add up to fifty-two. The fourth column is the probability of getting five cards containing the specified award card when five random cards are taken from a deck of fifty-two cards. This is taken from Table 3, based on the third column ("Number in Deck") value of Table 5. The fifth column of Table 5 is the Expected Value contribution (EV) that is a measure of the fraction of one coin that is returned to the player for the award specified in the first column. Multiplying the values in second column and fourth column, and dividing that product by the five coins required to qualify for "Deal and Win" awards, creates this fifth column. The sum of all of the fifth column values gives the Expected Value contribution for the entire "Deal and Win" feature. In this case, it is 0.032991658 or 3.2991658%.

The sixth column is the expected number of plays (hands) to win the specified award, which is the same as the third column of Table 3. This sixth column is the reciprocal of the fourth column, and shows that one of the five awards will be given on average about every 458 plays.

TABLE 5

| Award | Value in Quarters | Number in Deck | Probability (From Table 4) | EV Contribution per coin | Expected Plays |
|---|---|---|---|---|---|
| Car | 60,000 | 5 | 3.84769E−07 | 0.004617232 | 2,598,960.00 |
| Jacket | 400 | 8 | 2.15471E−05 | 0.001723766 | 46,410.00 |
| Steak Dinner | 200 | 11 | 0.000177763 | 0.007110537 | 5,625.45 |
| Polo Shirt | 100 | 12 | 0.000304737 | 0.006094746 | 3,281.52 |
| Buffet | 40 | 16 | 0.001680672 | 0.013445378 | 595.00 |
| | | 52 | 0.002185105 | 0.032991658 | 457.64 |

Table 6 shows the combined return of the base "Seven-Five lacks or Better" draw poker game with the "Deal and Win" awards in this five-coin quarter (twenty-five cent) embodiment. With optimal play of the "Seven-Five Jacks or Better" poker game, the combined games will return 0.994464 of the coins or credits played or a 99.45% return. With the normal 2-4% overhold due to non-optimal play, this combined game would return anywhere from about 95.5% to about 97.5% of the money played at five credits per hand. On the games played at one to four credits per hand, there is no eligibility for the "Deal and Win" awards in this version, so the return to the player would drop by about 3.3%.

TABLE 6

| Game | Return |
|---|---|
| 7-5 Jacks or Better Draw Poker | 0.961472 |
| “Deal and Win” Awards | 0.032992 |
| Total Return | 0.994464 |

As the “Deal and Win” awards are adapted to higher denominations or multi-hand games, the same frequency and award values will yield a lower EV contribution. For example, a five coin dollar version would drop the return from the “Deal and Win” feature by a factor of four; from 3.2992% to 0.82479%. This could be used as-is to generate a higher return for the operator, or it could be used with a higher paying base game, such as an “Eight-Six Jacks or Better” draw poker game (which yields a 98.3927% return with optimal play), or the awards could be made larger or more frequent for these higher paying players. These kind of tradeoffs, and their respective impacts on the rate of return, are readily calculable by those skilled in the art in view of the foregoing analysis. As the game is moved to lower denominations such as nickels, the return for the “Deal and Win” awards will go up by a factor of five; to about 16.5%. This would ordinarily be used with a much lower paying base game, or require more than five coins (which could be achieved in a multi-hand version for example), or the awards could be made smaller or less frequent or a combination of both. Again, these tradeoffs are well appreciated by those skilled in the art. Thus, while the invention has been disclosed and described with respect to certain embodiments, those of skill in the art have recognized modifications, changes, other applications and the like which will nonetheless fall within the spirit and ambit of the invention, and the following claims are intended to capture such variations.

We claim:

1. A method of operating a gaming machine, comprising the steps of:

placing a wager;

providing a first game of chance wherein said first game of chance is a card game employing a deck of cards and includes dealing a hand of cards to a player from said deck of cards;

providing a second game of chance operated at the beginning of said first game of chance and in conjunction with said first game of chance, wherein said second game of chance is a game having a plurality of differing award indicia, wherein said award indicia are assigned to each card dealt from said deck of cards, displaying said award indicia of said hand of cards, wherein said second game of chance has the potential on every play thereof for achieving an award; and awarding any award achieved in said second game of chance.

2. A method of operating a gaming machine, comprising the steps of:

placing a wager;

providing a first game of chance wherein said first game of chance is a five card poker game and includes dealing a hand of cards to a player, wherein said card game further comprises the step of dealing an opening hand of cards from which a player can choose to select cards to hold as well as select cards to discard, providing a second game of chance, said second game of chance is operated only in conjunction with said opening hand, wherein said second game of chance displays award indicia associated in a one to one correspondence with a card in said first game of chance hand, each award indicia being selected as well as discarded in accordance with its associated card, said card game including the further step of replacing any discarded card with another randomly selected card and said second game of chance including the step of replacing any discarded award indicia with another randomly selected award indicia; and awarding any award achieved in said second game of chance.

3. A method of operating a gaming machine, comprising the steps of:

placing a wager;

providing a first game of chance on a first position of said gaming machine wherein said first game of chance is a slot game having a reel display with a particular number of reels having first game indicia thereon, and wherein said step of providing said first game of chance includes a display of randomly selected first game indicia for each reel;

providing a second game of chance on a second position of said gaming machine separate and distinct from said first position, said second game of chance is operated only in conjunction with said first game of chance irrespective of said display of randomly selected first game indicia for each reel, wherein said second game of chance includes having a plurality of award indicia different from said first game indicia, a preset number of said award indicia being displayed in the course of said second game through a random selection, wherein said preset number of said award indicia is the same as said particular number of reels in said first game of chance, wherein said award indicia are associated in a one to one correspondence with said reels in said first game of chance, and said award is achieved through a predetermined association of said award indicia; and awarding any award achieved in said second game of chance.

4. The method of claim 3 wherein said award achieved in said second game of chance is a tangible good.

5. A method of operating a gaming machine, comprising the steps of:

placing a wager;

providing a first game of chance on a first position of said gaming machine wherein said first game of chance is a slot game having a reel display with a particular number of reels having first game indicia thereon, and wherein said step of providing said first game of chance includes a display of randomly selected first game indicia for each reel;

providing a second game of chance on a second position of said gaming machine separate and distinct from said first position, said second game of chance is operated only in conjunction with said first game of chance irrespective of said display of randomly selected first game indicia for each reel, wherein said second game of chance includes having a plurality of award indicia different from said first game indicia, a preset number of said award indicia being displayed in the course of said second game through a random selection, wherein said preset number of said award indicia is two or more indicia and said indicia are representative of a tangible (non-monetary) award, and said award is achieved through a predetermined matching association of said award indicia; and awarding any award achieved in said second game of chance.

* * * * *